June 16, 1964 G. A. LALAK 3,137,061

APPARATUS FOR ASSEMBLING WIRES

Filed June 13, 1960 15 Sheets-Sheet 1

INVENTOR.
GEORGE A. LALAK
BY
William A. Zalesak
ATTORNEY

INVENTOR.
GEORGE A. LALAK
BY
William A. Zalesak
ATTORNEY

June 16, 1964 G. A. LALAK 3,137,061

APPARATUS FOR ASSEMBLING WIRES

Filed June 13, 1960 15 Sheets-Sheet 3

INVENTOR.
GEORGE A. LALAK
BY
William A. Zalesak
ATTORNEY

APPARATUS FOR ASSEMBLING WIRES

Filed June 13, 1960 15 Sheets-Sheet 4

INVENTOR.
GEORGE A. LALAK
BY
William A. Zalesak
ATTORNEY

June 16, 1964 G. A. LALAK 3,137,061

APPARATUS FOR ASSEMBLING WIRES

Filed June 13, 1960 15 Sheets-Sheet 5

INVENTOR
GEORGE A. LALAK
BY
William A. Zalesak
ATTORNEY

INVENTOR.
GEORGE A. LALAK
BY
William A. Zalesak
ATTORNEY

INVENTOR.
GEORGE A. LALAK
BY
William A. Zalesak
ATTORNEY

June 16, 1964 G. A. LALAK 3,137,061

APPARATUS FOR ASSEMBLING WIRES

Filed June 13, 1960 15 Sheets-Sheet 8

INVENTOR.
GEORGE A. LALAK
BY
William A. Zalesak
ATTORNEY

INVENTOR.
GEORGE A. LALAK
BY William A. Zalesak
ATTORNEY

June 16, 1964 G. A. LALAK 3,137,061

APPARATUS FOR ASSEMBLING WIRES

Filed June 13, 1960 15 Sheets-Sheet 10

INVENTOR.
GEORGE A. LALAK
BY
William A. Zalesak
ATTORNEY

APPARATUS FOR ASSEMBLING WIRES

Filed June 13, 1960

INVENTOR.
GEORGE A. LALAK
BY
William A. Zalesak
ATTORNEY

INVENTOR.
GEORGE A. LALAK
BY
William A. Zalesak
ATTORNEY

June 16, 1964 G. A. LALAK 3,137,061

APPARATUS FOR ASSEMBLING WIRES

Filed June 13, 1960 15 Sheets-Sheet 13

INVENTOR.
GEORGE A. LALAK
BY
William A. Zalewak
ATTORNEY

June 16, 1964 G. A. LALAK 3,137,061

APPARATUS FOR ASSEMBLING WIRES

Filed June 13, 1960 15 Sheets-Sheet 14

INVENTOR
GEORGE A. LALAK
BY
William A. Zalesak
ATTORNEY

INVENTOR.
GEORGE A. LALAK
BY William A. Zalesak
ATTORNEY

3,137,061
APPARATUS FOR ASSEMBLING WIRES

George A. Lalak, Springfield, N.J., assignor to Radio Corporation of America, a corporation of Delaware Filed June 13, 1960, Ser. No. 35,663
34 Claims. (Cl. 29—203)

This invention relates to fabrication of electron tubes and particularly to an apparatus for fabricating electron tube stem assemblies which comprise a header wafer through which a plurality of lead-in conductors are sealed in vacuum-tight relation.

One form of such a stem assembly suitable for fabrication on apparatus made according to my invention comprises a small ceramic disk through which a plurality of bores are provided. The ceramic disk is provided with metalized surface coatings on the walls of the bores and around the outer peripheral cylindrical surface thereof. A corresponding plurality of fine wire conductors of differing lengths are inserted into or through the bores and brazed thereto. The brazing may be accomplished by depositing a small copper washer over each of the conductors and against one surface of the ceramic disk and then heating the assembly in a brazing furnace to cause the copper to melt and flow into the bores around the conductors therein. Such stem assemblies used in some very small electron tubes comprise a base wafer having a diameter no greater than 400 mils through which a number of conductors, each approximately 16 mils in diameter, are sealed. Manual assembly of such a stem structure requires precutting of different length leads and is not only tedious and slow, but often results in manufacturing shrinkage due to accidental distortion of the lead wire conductors, all of which gives rise to high manufacturing costs.

It is therefore an object of this invention to provide an improved apparatus for automatically or semiautomatically cutting the leads to predetermined different lengths and assembling a stem structure of the kind described for subsequent brazing.

According to my invention apparatus is provided in which a plurality of wires are fed through a fixture to position the wires in a predetermined parallel array. The arrayed wires are then engaged by a feed mechanism and, while maintained in their array, longitudinally advanced into abutment with a plurality of positioner stops and then severed to desired lengths to provide a plurality of conductors of predetermined lengths disposed in a predetermined array. The conductors, while being maintained in their predetermined array, are then fed into a corresponding array of bores in the header wafer held in proper position on the apparatus. A like array of brazing washers are punched from a sheet and, while being maintained in their array, are disposed over the conductors. The conductors are then individually and, if desired, differentially longitudinally positioned within the header wafer and subsequently brazed thereto.

The invention is embodied in apparatus which includes a wire feed mechanism, a wire check mechanism which permits wires to be advanced therethrough in only one direction, a wire positioner mechanism for differentially longitudinally positioning the wires, an assembly jig mechanism, and a brazing washer punching mechanism.

The feed and check mechanisms are similar to each other in that they are adapted to individually frictionally engage a plurality of wires in very closely spaced nonplanar array. They differ in that the feed mechanism exerts frictional gripping of the wires threaded therethrough to equal degrees regardless of the direction in which they are being urged relative to the feed mechanism; the check mechanism, on the other hand, exerts greater frictional gripping in response to one direction of wire urging, or movement, than to gripping in response to urging or movement of the wires in the opposite direction.

The wire positioner mechanism comprises a plurality of tubes in parallel array whose end surfaces are longitudinally spaced from each other. The end surfaces serve as differentially longitudinally spaced stops against which wires are advanced into contact for providing a predetermined relative positioning thereof.

The assembly jig comprises a housing for receiving stem parts and moveable support surfaces for adjustably positioning stem conductors relative to each other and to the stem header wafer.

The brazing washer punching mechanism comprises a plurality of tubular punches for punching washers from prepunched sheet material and disposing the washers over conductors of a stem assembly. Means is provided in association with each punch for positively stripping a punched brazing washer from its punch and insuring that it remains in contact with the conductor over which it has been disposed.

Figure 4:
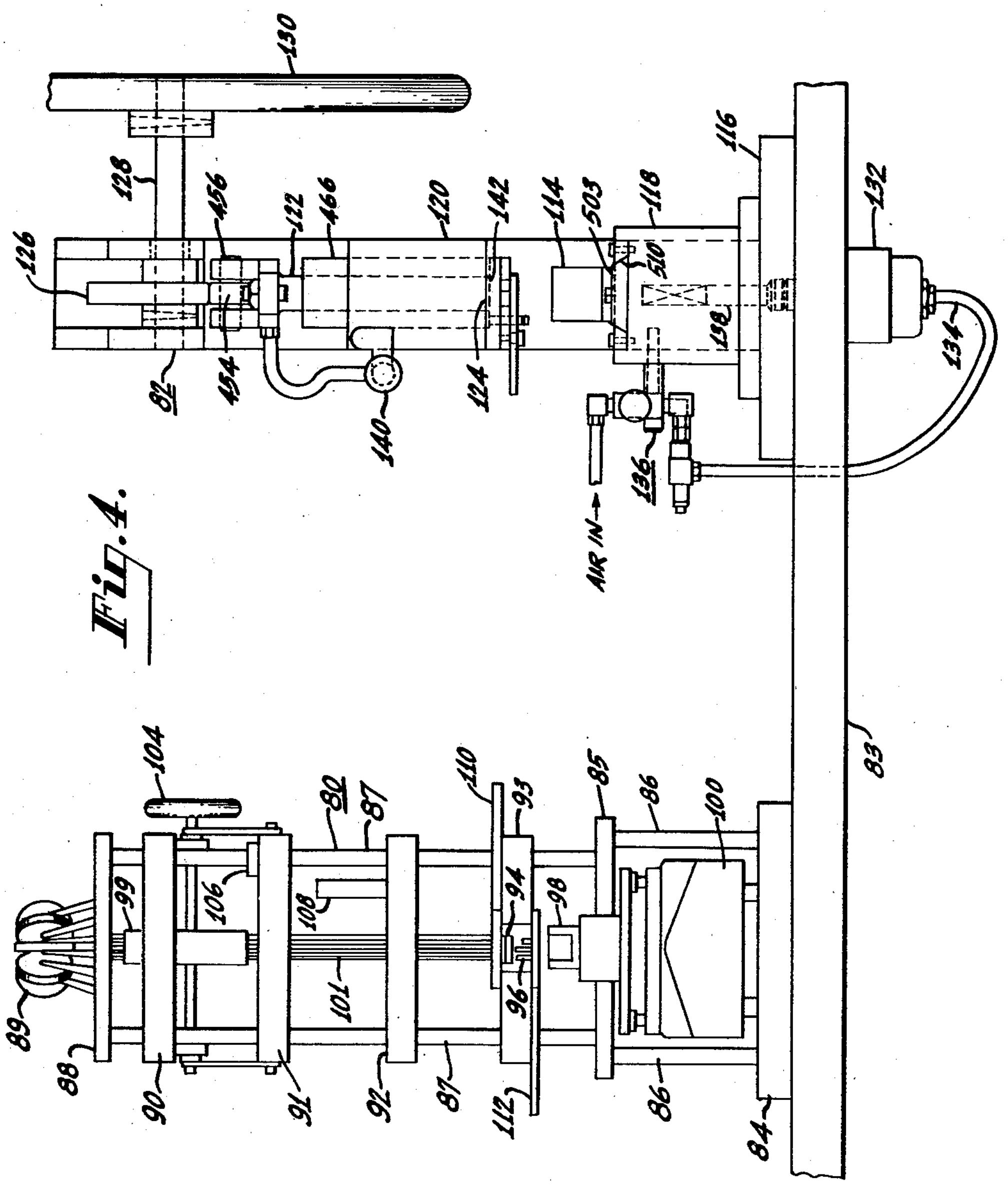
Figure 5:
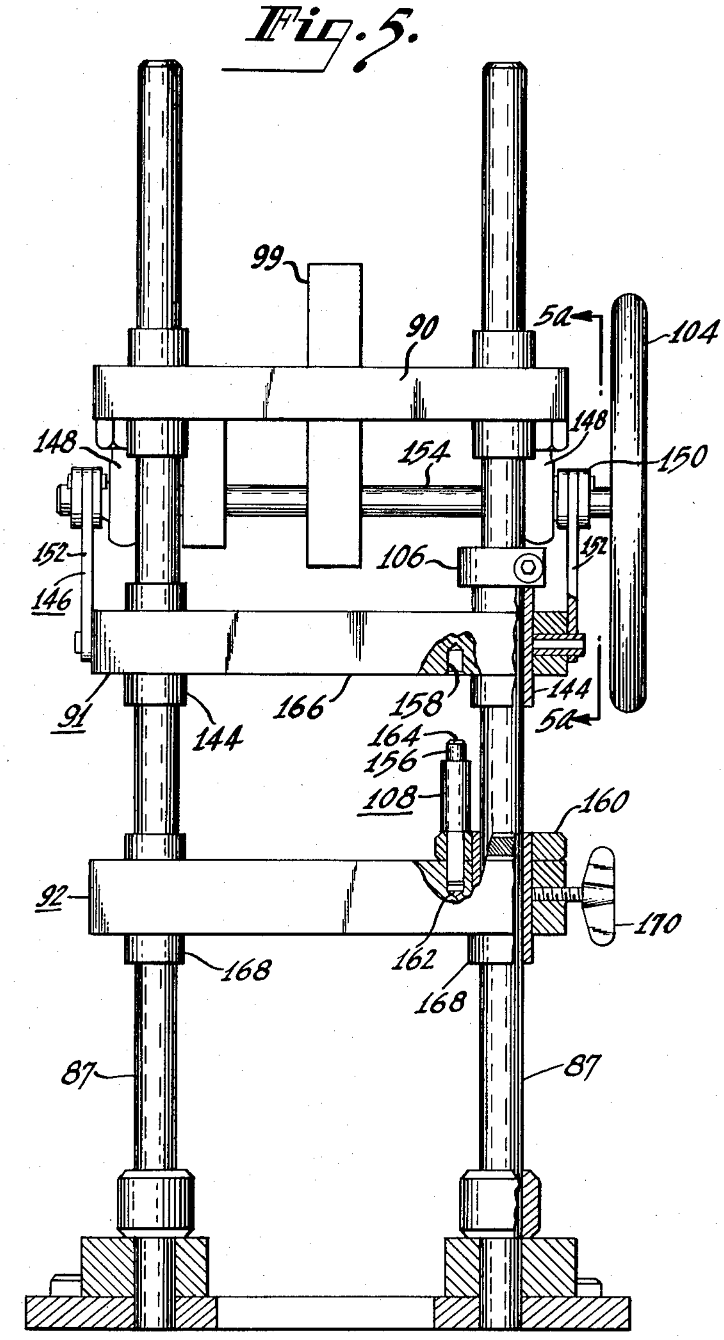
Figure 5A:
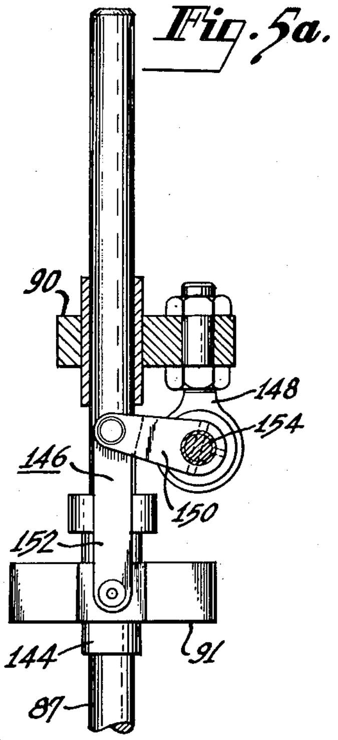
Figure 10:
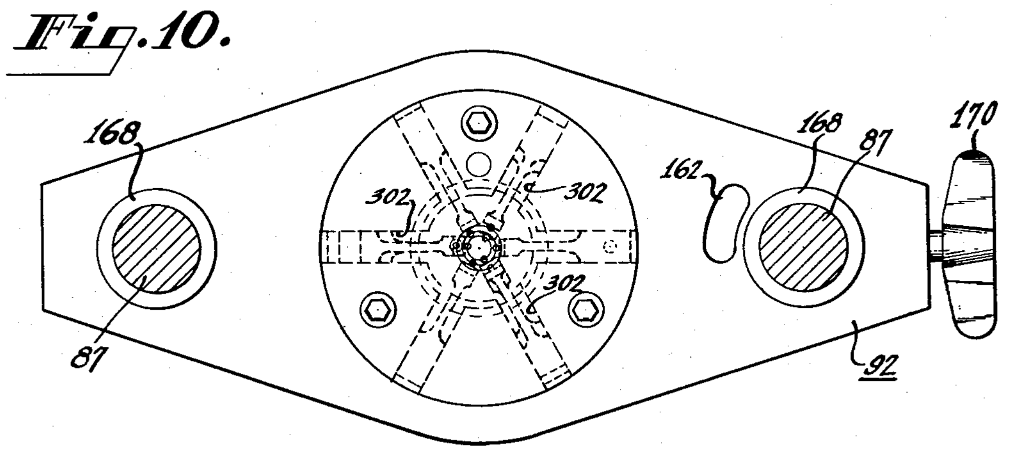
Figure 11:
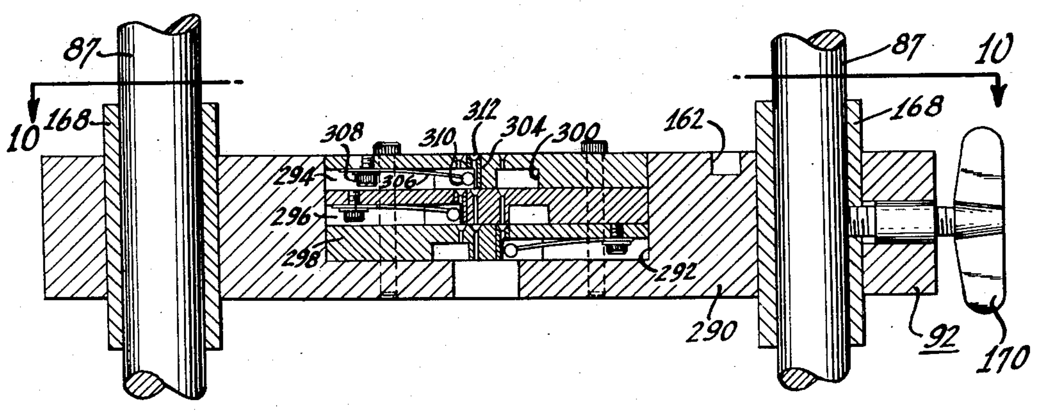
Figures 12, 13:
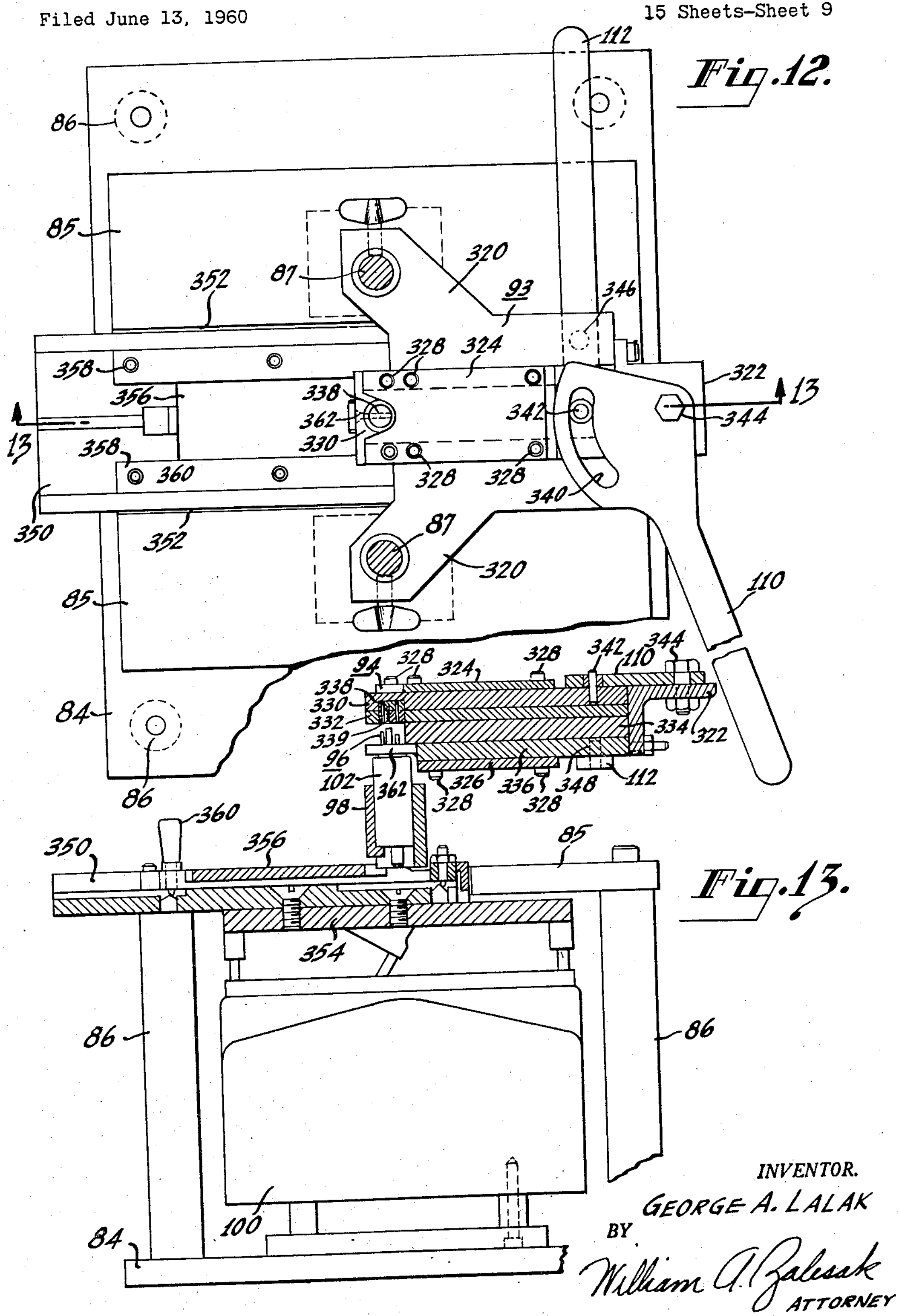
Figure 15:
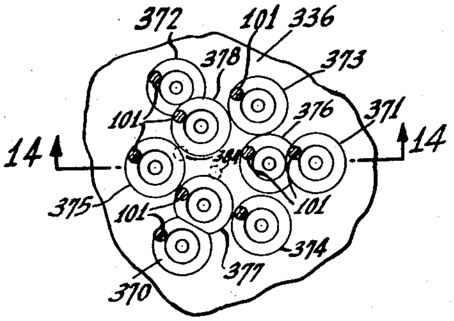
Figure 14:
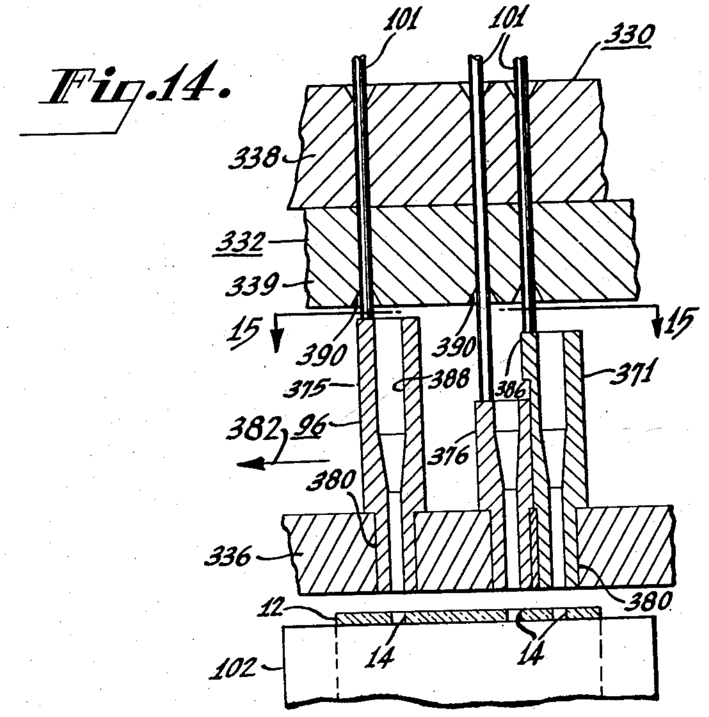
Figures 16, 17, 18:
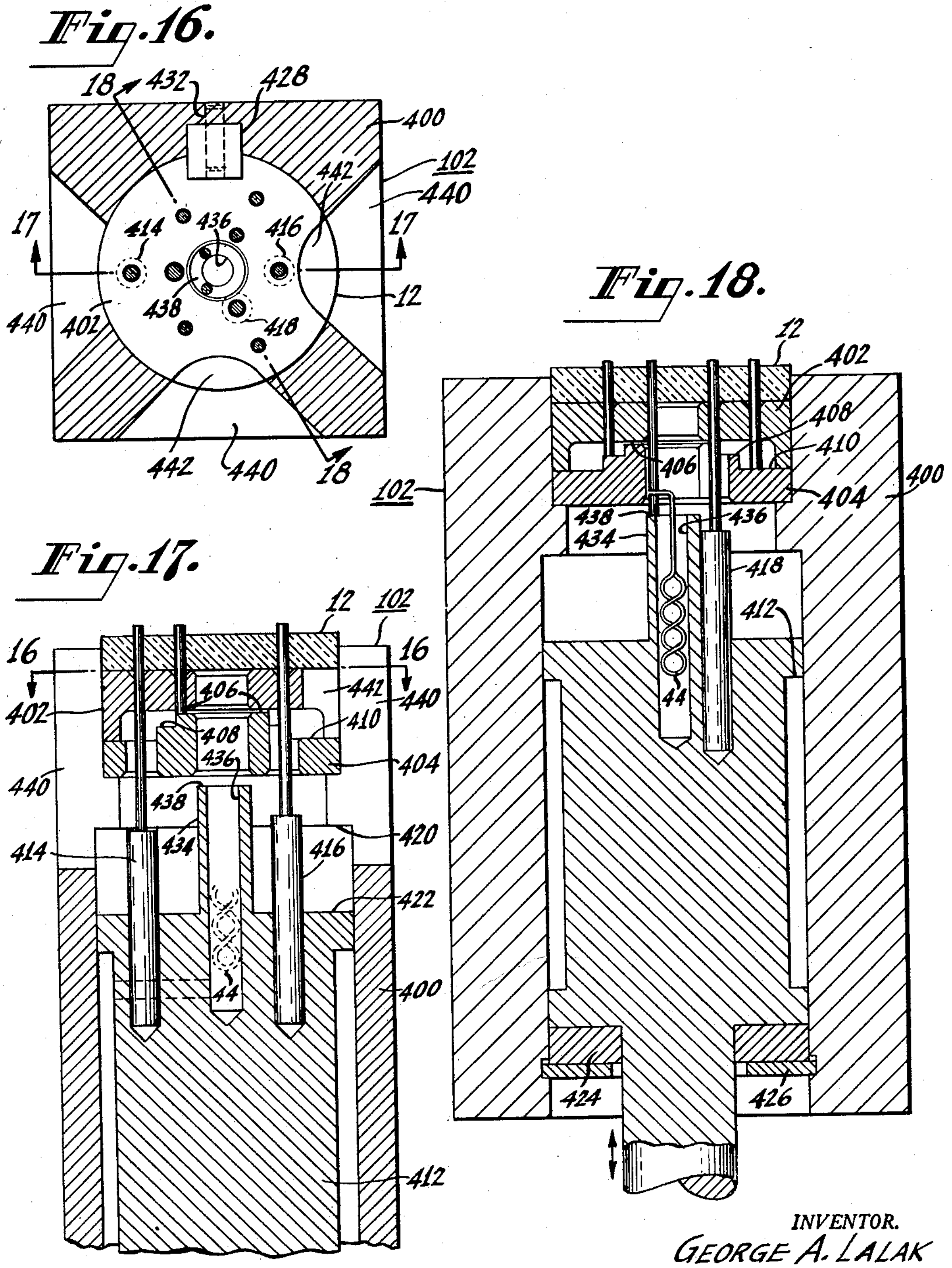
Figure 19:
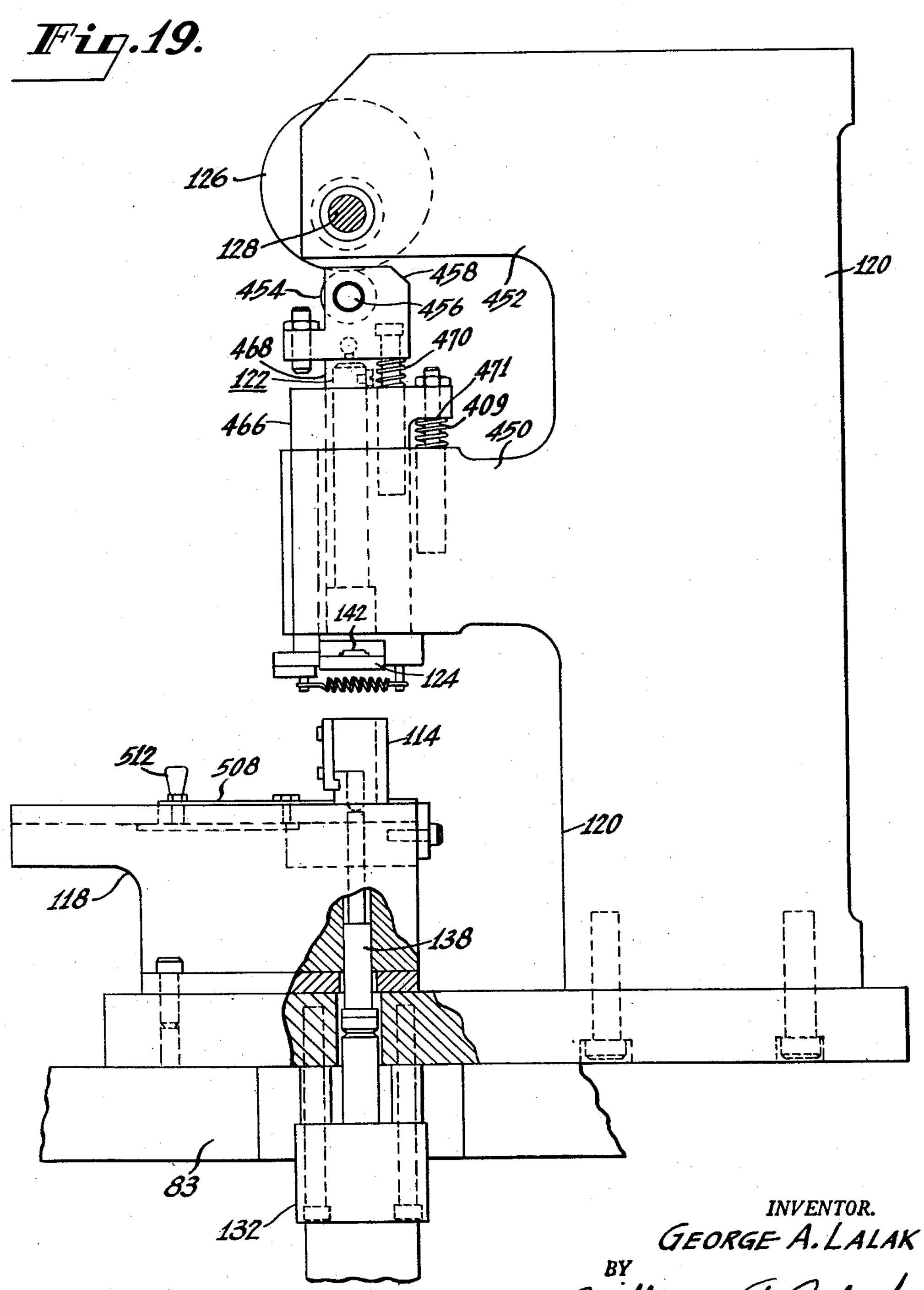
Figure 20:
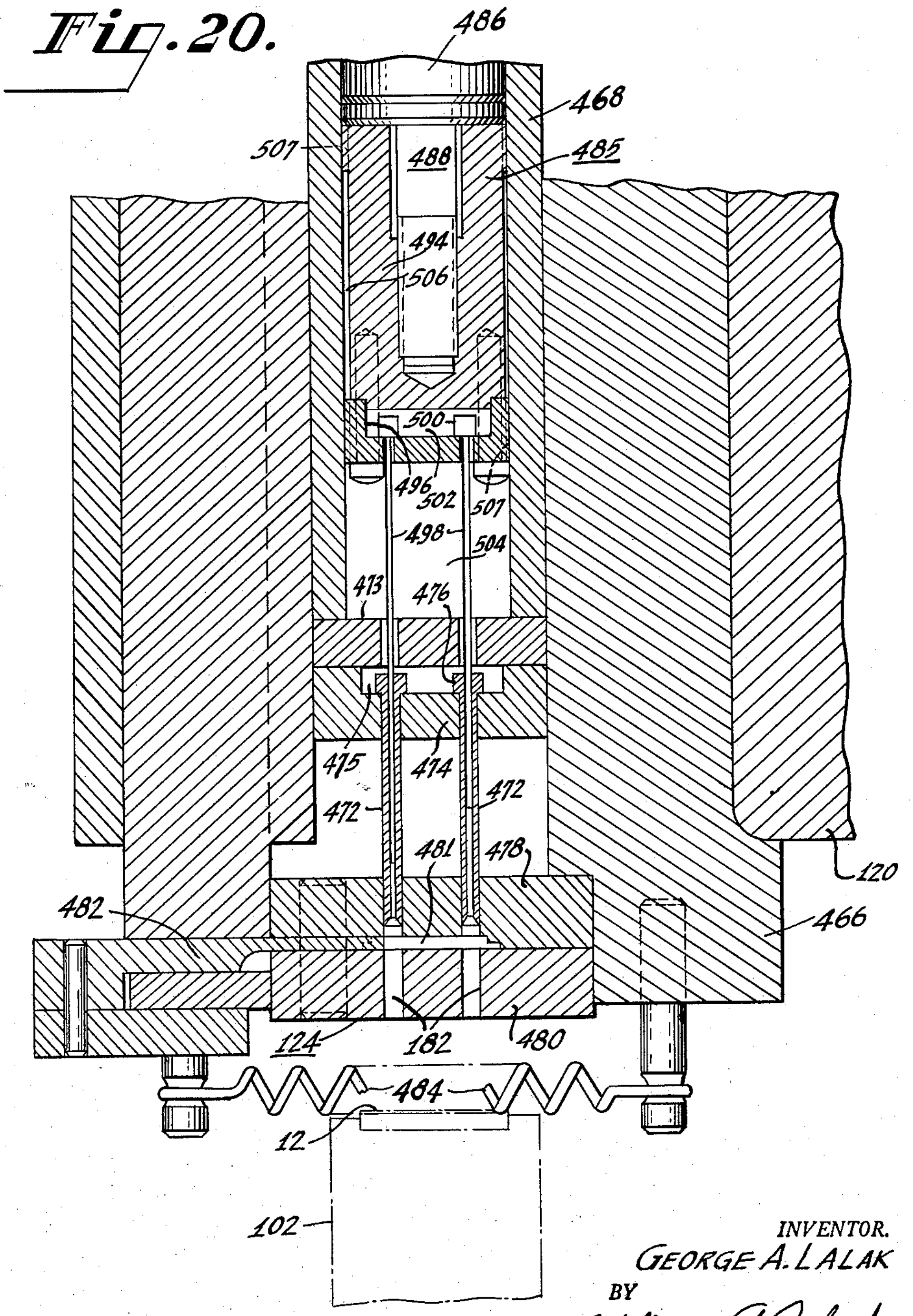
Figure 21:
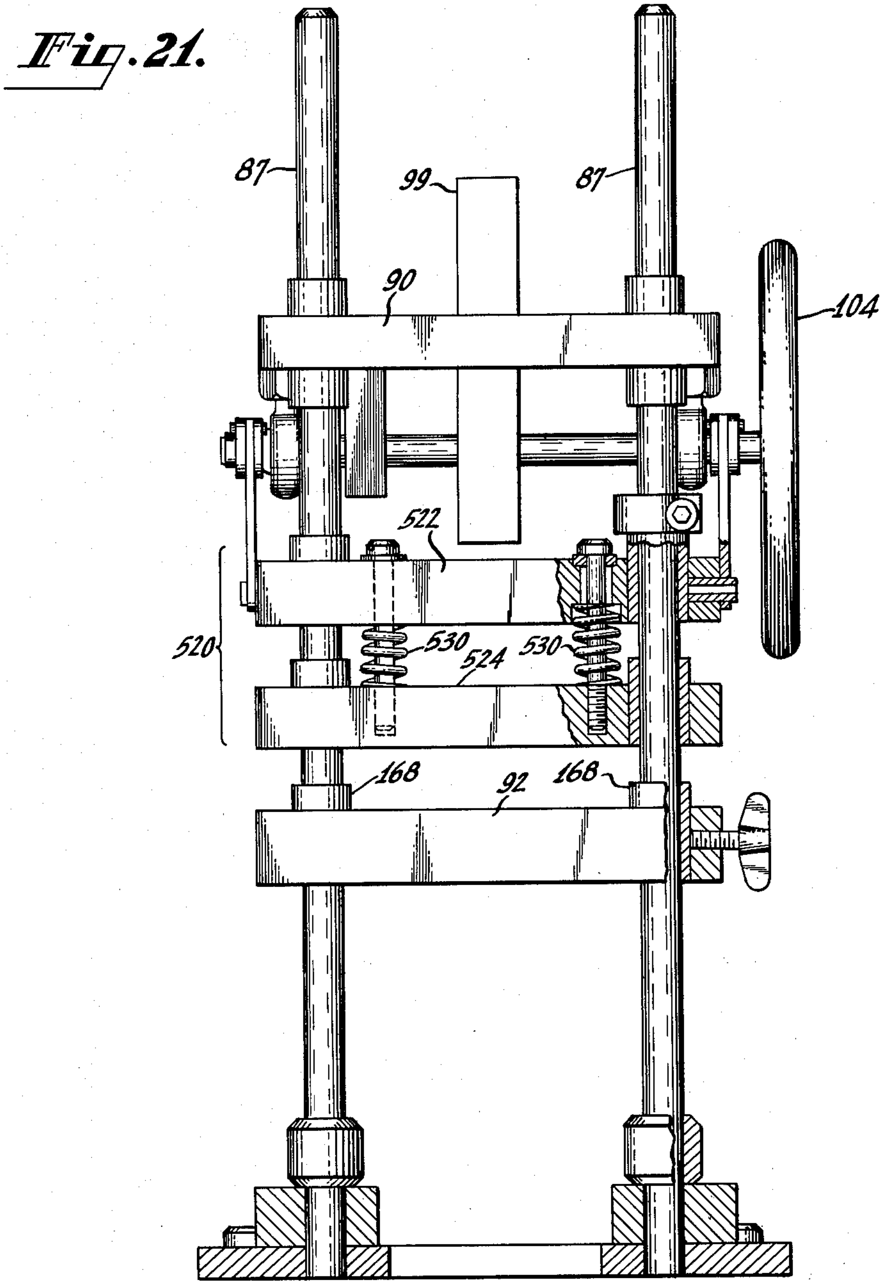
Figure 22:
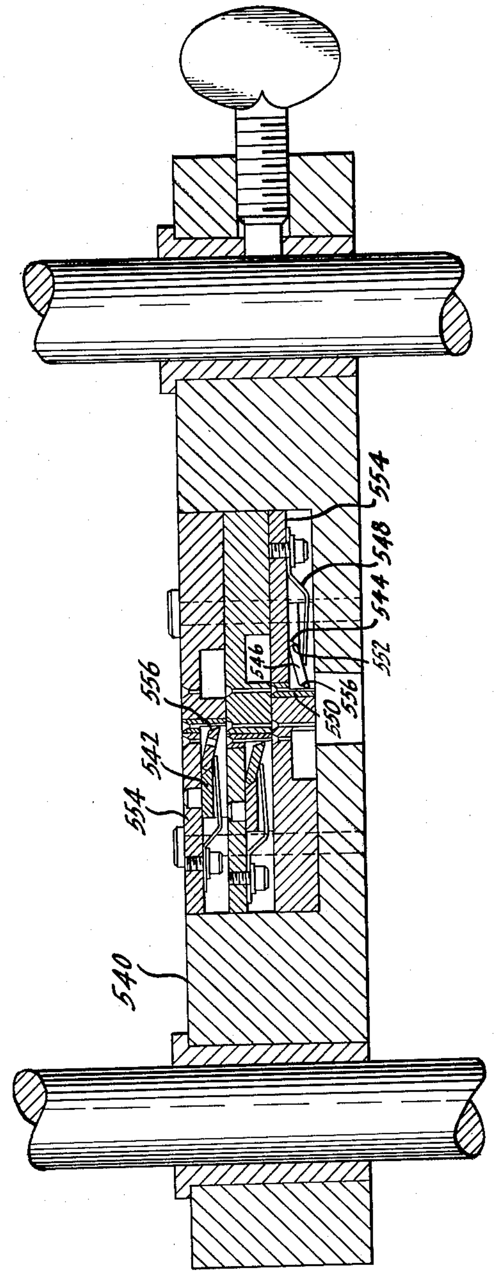
Figure 23:
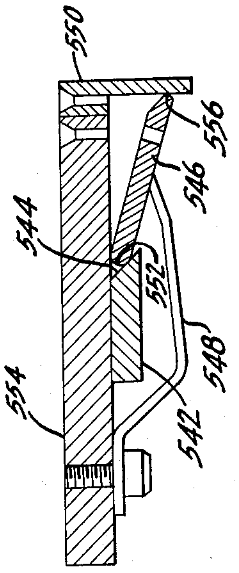

FIGS. 3*a*–3*k* are partial schematic section views of apparatus generally illustrating the successive steps of the method of making a stem assembly to which my invention is directed;

FIG. 4 is a front elevation view of apparatus made according to my invention;

FIGS. 5 and 5*a* are enlarged elevation views in partial section of the wire feed and check mechanisms of FIG. 4;

FIGS. 6–9 are section views of portions of the wire feed mechanism of FIG. 5;

FIGS. 10 and 11 are plan and sectional views, respectively, of the wire check mechanism of FIG. 5;

FIGS. 12 and 13 are, respectively, enlarged plan and partial vertical section views of the lead wire cutter and loading mechanisms of FIG. 4;

FIGS. 14 and 15 are enlarged longitudinal section and plan views, respectively, of the wire positioning and cutting mechanism of the apparatus of FIGS. 12 and 13;

FIGS. 16, 17, and 18 are, respectively, enlarged plan, section, and section views of the assembly and transfer jig of the apparatus of FIGS. 12 and 13;

FIG. 19 is a side elevation view of the washer punching mechanism of the apparatus of FIG. 4;

FIG. 20 is an enlarged longitudinal section view of a portion of the mechanism of FIG. 19;

FIG. 21 is a front elevation of a modification of the feed and check mechanisms of FIGS. 5 and 5*a*;

FIG. 22 is a sectional view of a modification of the wire check mechanism of FIG. 11; and FIG. 23 is an enlarged section view of a portion of the wire check mechanism of FIG. 22.

*Product Produced by Invention*

Figure 1:
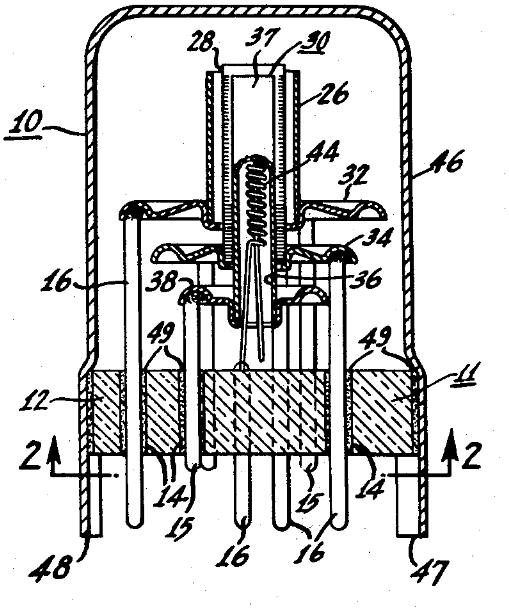
FIG. 1 is a side elevation view partly in section of an electron tube incorporating a stem assembly suitable for fabrication according to my invention.
Figure 2:
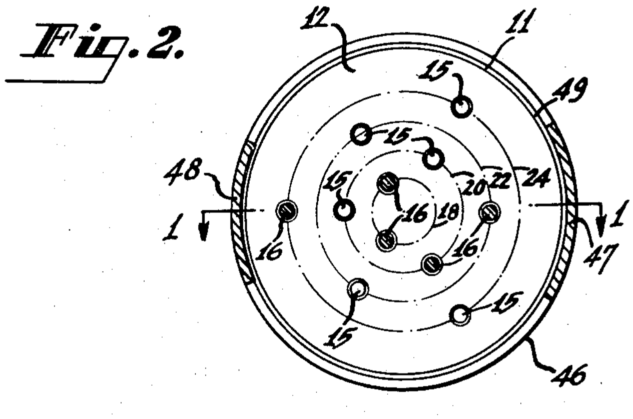
FIG. 2 is a bottom plan view taken along line 2—2 of FIG. 1.

FIGS. 1 and 2 show one form of an electron tube 10 having a stem 11 adapted to be fabricated according to the invention. The stem 11 of the tube 10 includes a ceramic disk header wafer 12 having a plurality of bores 14 through which a plurality of electrodes support conductors 15 and a plurality of lead-in conductors 16 are sealed in vacuum-tight relation.

As shown in FIG. 2, the bores 14 are arrayed in four concentric circles 18, 20, 22, and 24 shown in phantom.

Three bores are disposed in 120° equidistant relation on each of the three outer circles 20, 22, and 24; two bores, angularly spaced 120° from each other, are disposed on the inner circle 18. The bores in adjacent circles are angularly displaced 60° to provide maximum spacing therebetween.

The electron tube 10 comprises coaxial, cylindrical anode, grid, and cathode electrodes 26, 28, and 30, respectively. The anode 26 is mounted on a radially extending flange 32 which in turn is mounted on two support conductors 15 and one lead-in conductor 16, each of which extends into one of the bores on the outer circle 24. The gride electrode 28 is similarly mounted on a radially extended flange 34. The grid flange 34 is in turn mounted on a pair of support conductors 15 and a lead-in conductor 16, each of which extends into one of the bores on the circle 22. The cathode assembly 30 comprises a cathode support sleeve 36 and a surrounding emissive sleeve 37. The support sleeve 36 is mounted on a radially extending flange 38 which is in turn mounted on a pair of support conductors 15 and a lead-in conductor 16, each of which extends into one of the three bores on the circle 20. A coiled heater 44 is disposed in the cathode 30 and connects to a pair of lead-in conductors 16, which are sealed through the two bores 14 on the inner circle 18.

A vacuum-tight envelope is provided by a cup-shaped shell 46 which is sealed to the periphery of the header wafer 12. The shell 46 includes a pair of arcuate tongues 47 and 48 of different width, which serve to protect the externally extending lead-in conductors 16 and to facilitate socketing of the tube.

As described above, each of the anode, grid, and cathode electrodes is supported from the header wafer 12 on a set of three conductors onto the ends of which the electrode's support flange is seated. Each set of three conductors includes two support conductors 15 and a single lead-in conductor 16. In the case of each electrode, the lead-in conductor 16 is the only one of the three conductors of a set which extends a substantial distance beyond the header wafer 12 externally of the tube. The two support conductors 15 of each set extend through the disk header 12 and externally therefrom only a very short distance. The support conductors 15 are not intended for use as electrical terminals.

In the fabrication of the electron tube 10, a metallic coating 49, such as molybdenum, is applied to the ceramic header 12 on its outer cylindrical periphery and on the walls of the bores 14. Such a coating may be applied by any suitable known metallizing process. The support and lead-in conductors 15 and 16 can thus be brazed to the walls of the bores 14 to provide vacuum-tight seals. Likewise, the envelope shell 46 can be brazed or soldered to the outer periphery of the header wafer 12 in vacuum-tight relationship to form a completed vacuum enclosure. The tube 10 is exhausted between the header wafer 12 and the shell 46 before the shell is soldered to the wafer. This is done in a vacuum furnace at the time this final solder seal is made.

By virtue of the structure of the electron tube 10, it will be appreciated that support and lead-in conductors 15 and 16 of various different lengths must be provided. For example, in the case of a set of three conductors supporting any one electrode, the lead-in conductor 16 is somewhat longer than the two support conductors 15 because of its added terminal extension externally of the tube. Also, because electrode support flanges 32, 34, and 38 are spaced different distances from the ceramic disk header 12, the conductors for each electrode must likewise have lengths greater or less than the conductors of the other electrodes. Accordingly, the method and apparatus of the present invention involves automatically providing such differential conductor lengths in the fabrication of the stem 11.

*General Method of Fabrication and Schematic Apparaus Therefor*

For purposes of clarity of description, the method of stem fabrication to which my invention relates is described with reference to FIGS. 3*a*–3*k* as embodying the fabrication of a stem including a header wafer 12′ having only one support conductor 15′ and one lead-in conductor 16′. It will, however, be appreciated that suitable apparatus can be provided according to the teaching herein set forth for fabricating multi-conductor stem structures such, for example, as the stem 11 shown in FIGS. 1 and 2.

In FIGS. 3*a*–3*f* there is shown a positioner device 50 for positioning a plurality of wires 51 of an array of wires at mutually different longitudinal dispositions; a pair of cutters 52 having an upper blade 53 and a lower blade 54 for severing the wires so positioned; and a holding and transfer jig 55 for receiving the ceramic header 12′.

According to the invention, wire 51 are fed, for example from supply spools (not shown), through aligned bores in the blades 53 and 54 of the cutters 52 and into end abutting contact with the positioner 50. The positioner 50 is provided with a plurality of bores therethrough, each of which includes an offset portion providing a shoulder stop 62 to longitudinally position the wires 51. The shoulder stops 62 are disposed at different distances from the cutter 52 so that the wires 51 are differentially longitudinally positioned. Accordingly, when positioned against the stops 62, the wires 51 are subsequently cut to provide one support conductor 15′ and one lead-in conductor 16′. The conductors will be of different lengths.

Figures 3A, 3B, 3C, 3D, 3E, 3F:
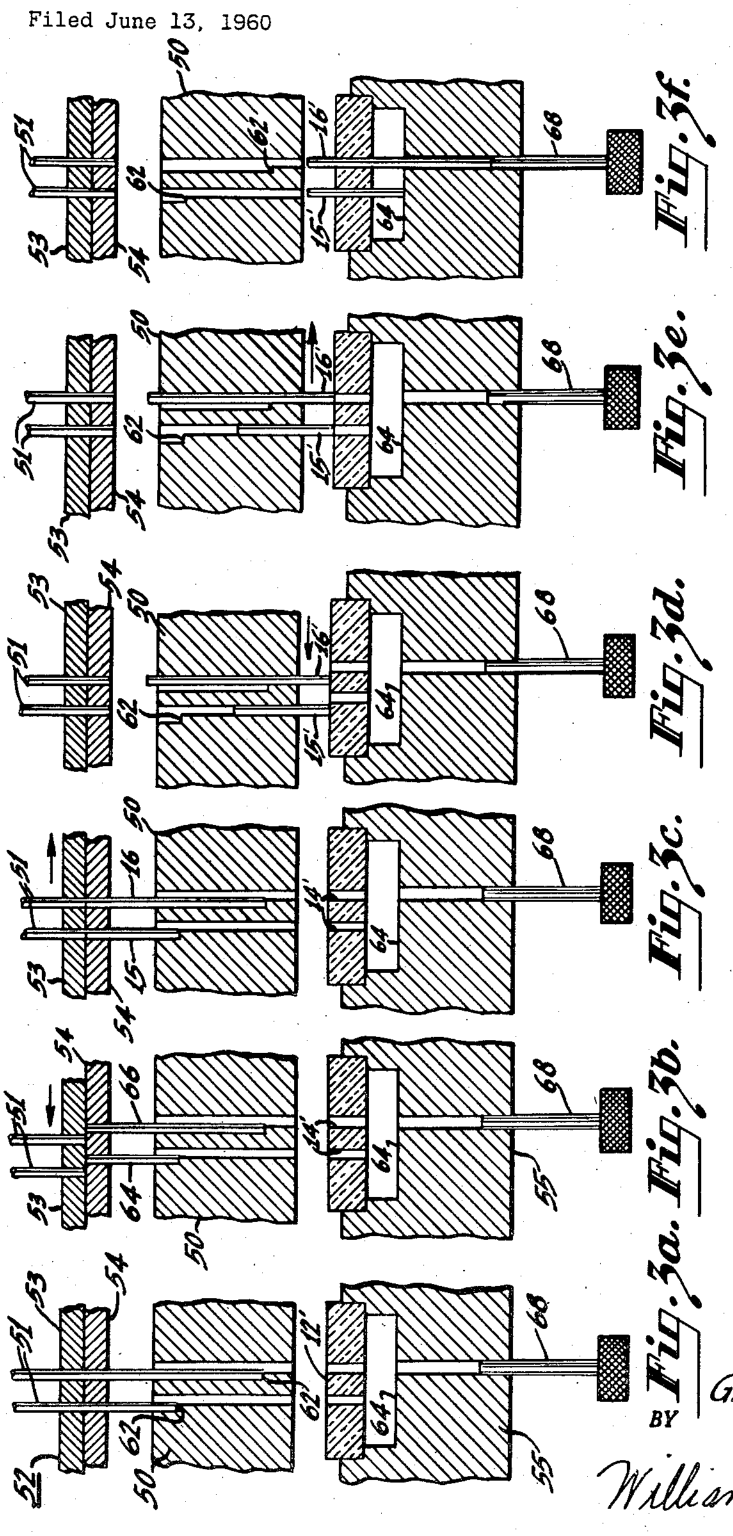

Cutting of the conductors 15′ and 16′ is illustrated in FIG. 3*b* wherein the upper blade 53 is moved laterally to completely sever the wires 51. The upper blade 53 is then moved back to its original position as shown in FIG. 3*c*.

The positioner 50 is then shifted laterally to a position as illustrated in FIG. 3*d*. During such shift, the conductors 15′ and 16′ are retained against lateral movement by the lower cutter blade 54. Thus, when the positioner 50 has moved a distance sufficient to bring the lower portion of its bores into alignment with the conductors 15′ and 16′, the conductors drop downwardly upon the upper surface of the header wafer 12′ as shown in FIG. 3*d*. To insure dropping of the conductors 15′ and 16′, the wires 51 are advanced into the lower blade 54 to push the conductors 15′ and 16′ therefrom. This condition is also illustrated in FIG. 3*d*.

Then, as illustrated in FIG. 3*e*, the positioner 50 is laterally retracted to its original position. This moves the conductors 15′ and 16′ into alignment with the bores 14′ in the header wafer 12′.

The jig 55 is then vibrated with a conventional vibrator (not shown) and the conductors 15′ and 16′ are caused to settle downwardly by gravity into and through the bores 14′. The support conductor 15′ engages a fixed surface stop 64 of the jig 55 and the lead-in conductor 16′ engages a push rod 68. The contact surfaces of the surface stop 64 and of the push rod 68, respectively, are differentially spaced from the header wafer 12′ at predetermined locations. Thus, at this stage of fabrication of the stem 11′, both the support conductor 15′ and the lead-in conductor 16′ are positioned with their upper ends extending equally, a very short distance above the top surface of the ceramic wafer 12′.

The required number of conductors having been cut to the required length and disposed in the header wafer 12′, the jig 55 containing the header 12′ and the conductors 15′ and 16′ is transferred to a brazing washer-puncher station. Thus, the jig serves the double function of both a holding device to support the stem 11 during its fabrication and also part of a transfer means to carry the partially fabricated stem to the second, or washer-punching, station. At this station small washers of a suitable brazing material are punched from a sheet and disposed over the upwardly extending ends of the conductors 15′ and 16'. The washer punching operations are shown in FIGS. 3h to 3k.

Figure 3G:
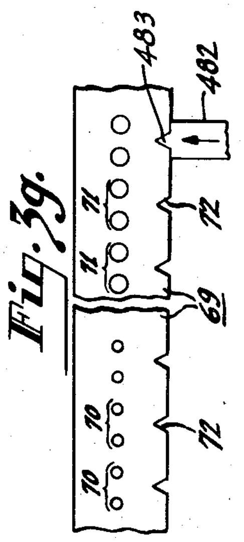

In FIG. 3g a strip of brazing material 69 is shown. The strip 69 prior to undergoing the punching process illustrated in FIGS. 3h to 3k is prepunched by apparatus not shown to provide sets of holes 70 therein in an array corresponding to the array of bores through the ceramic disk header 12'. Although in fabrication of the stem 11 this array would include eleven holes, the strip 69 is shown to comprise sets of two holes 70, each for schematic consistency with the fabrication of stem 11' illustrated in FIGS. 3a–3k. The strip 69 also includes a series of indexing V notches 72 for alignment thereof in the punching apparatus. In FIG. 3g the strip 69 is shown having a portion which after the prepunching operation has had washers punched therefrom. Such washer punching leaves the enlarged holes 71 therein.

The punching apparatus illustrated in FIGS. 3h–3k comprise a punch 73 and a die 74. The punch 73 includes a plurality of punch rods 76 and 78, each of which is provided in the end thereof with a concentric bore 79 having a diameter sufficient for receiving one of the conductors 15' or 16'. The punch rods are arrayed identically with the arrays of the prepunched holes 70 in the strip 69 and of the bores 14' in the header wafer 12'. The die 74 is provided with a plurality of aligned bores in corresponding array.

Figure 3K:
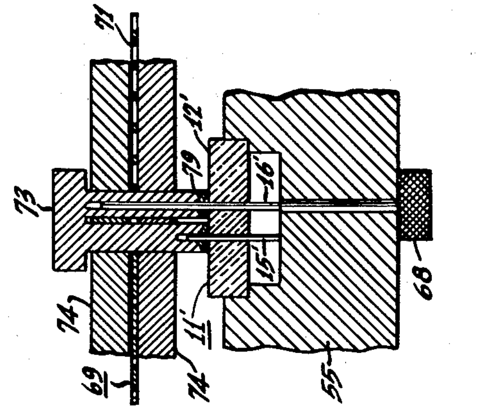

In the washer punching operation the jig 55 is positioned with the header wafer 12' and conductors 15' and 16' contained therein in alignment with the punch rods 76 and 78. The prepunched strip 69 is disposed in the die 74 and one set of holes 70 therethrough is also aligned with the punch rods 76 and 78. This condition is illustrated in FIG. 3i.

Figure 3J:
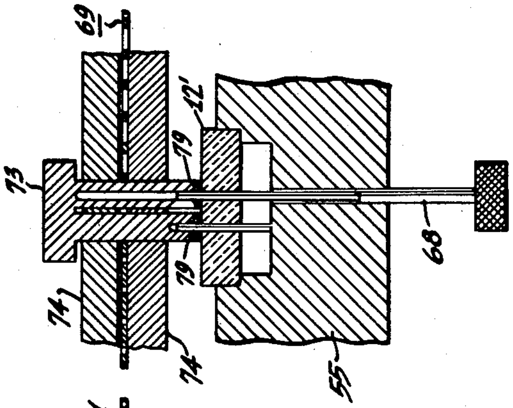
Figure 3I:
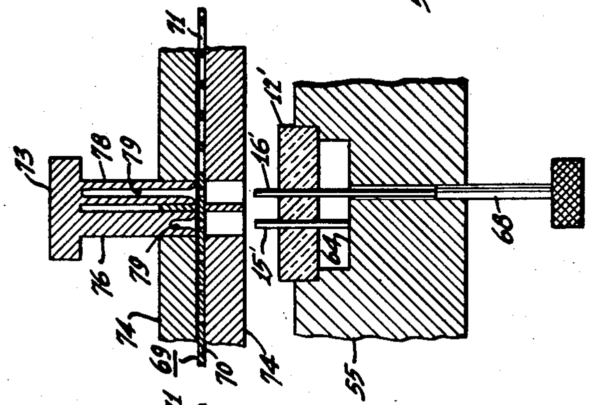
Figure 3H:
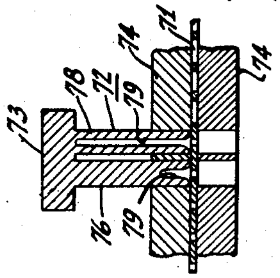

As shown in FIG. 3j, the punch 73 is actuated downward punching a pair of washers 79 out of the strip material 69. The punch 73 continues downward until the washers 79 are forced over the conductors 15' and 16' and against the header wafer 12'.

As illustrated in FIG. 3k, the punch 73 is maintained in its downward position and the push rod 68 is actuated upwardly to position the lead-in conductor 16' at its desired ultimate disposition relative to the ceramic disk header 12'. The portion of the lead-in conductor 16' now extending above the wafer 12', as shown in FIG. 3k, serves as a terminal prong in the finished tube. The support conductor 15' already having been positioned at its ultimate relative disposition with the ceramic disk header 12' is not moved. However, it will be noted that the raising of the lead-in conductor 16' brings the lower ends of the two conductors 15' and 16' into alignment in a common plane spaced from the ceramic disk header 12'. Thus, they are now suitably disposed to receive thereon an electrode support flange similar to the flanges 32, 34, or 38.

The punch 73 can then be retracted and the jig 55 removed. The assembled stem 11' including the ceramic header 12', the conductors 15' and 16', and the brazing washers 79 can then be removed from the jig 55 and integrated in a suitable brazing jig with the remaining parts of the electron tube 10 for a final exhaust and brazing processing thereof.

*General Overall Apparatus*

FIG. 4 illustrates one form of apparatus according to my invention for practicing the fabrication method described above. The apparatus of FIG. 4 includes apparatus 80 for positioning, cutting, and disposing conductor lengths into the ceramic header 12, and apparatus 82 for punching brazing washers and disposing them over the conductors in the ceramic header, both of which are mounted on a common table support 83. For brevity, the apparatuses 80 and 82 will be referred to simply as the cutting apparatus and the punching apparatus, respectively.

The cutting apparatus 80 comprises a base 84 from which a platform 85 is supported on a plurality of posts 86. A pair of columns 87 are in turn mounted on the platform 85 and support in tiered arrangement: a spool table 88 on which an array of nine wire supply spools 89 are mounted, a wire guide member 90, a wire feed unit 91, a wire reverse-motion check unit 92, and a plate 93 on which a cutter mechanism 94, and a wire positioner 96 are mounted. A jig holder or support 98 is mounted on a vibrator 100 which in turn is mounted on the base 84. The jig support 98 extends through an opening in the platform 85 out of contact with the platform 85.

To prepare the cutting apparatus 80 to fabricate a stem 11, nine wires 101 from the nine spools 89 are threaded through a guide tube 99 in the wire guide member 90, through an array of bores in the feed unit 91, the check unit 92, and the cutter mechanism 94. The nine wires 101 are thus so arrayed as to correspond to the three sets of three conductors on the circles 20, 22, and 24 of the header wafer 12.

To fabricate a stem 11 (see FIG. 1), a ceramic header wafer 12 is prepared by disposing a pair of proper length lead-in conductors 16 through the two bores on the inner circle 18 and connecting a heater 44 thereto. Assembly of the heater 44 and its conductors 16 into the header wafer 12 may be done manually. This comprises a preprocessing step prior to the operations performed on the cutting apparatus 80. The wafer 12, together with the heater 44 and its two lead-in conductors 16, is then placed in an assembly and transfer jig 102 (FIGS. 16–18); the jig 102 is disposed in the jig support 98. The jig and its wafer are angularly aligned with the array of nine wires 101 to be disposed therein. Such angular alignment may be made as hereinafter described using the two heater lead-in conductors already in the header 12.

The wire guide 90 and the check unit 92 are normally fixed against any motion on the support columns 87. The wire feed unit 91 is adapted to be slidably moved along the columns 87 by an actuating wheel 104 and its associated linkage. When the wheel 104 is turned, it actuates the feed unit 91 downwardly from out of contact with an upper stop 106 and into contact with the lower post stop 108. The feed unit 91 includes grippers which individually grip the wires 101 threaded therethrough and thus advance the wires through the check unit 92 and the cutter mechanism 94 and into contact with spaced stops of the positioner 96. After all wires have been thus advanced into contact with the stops, the wires 101 are severed by cutter mechanism 94. The feed unit is then retracted to its upper position by reverse rotary actuation of the wheel 104. During this retraction the check unit functions to prevent any retraction of the wires 101 therethrough and thus out of contact with their respective stops in the positioner 96.

With the wires 101 advanced into contact with the stops of the positioner 96, cutters 94 are actuated by movement of the handle 110 to sever all of the wires 101. The positioner 96 is then laterally shifted by actuation of the handle 112 to permit the conductors severed thereby to fall through the positioner 96 and into contact with the ceramic header 12 disposed in the jig 102. Retraction of the positioner 96 by the handle 112 and operation of the vibrator 100 results in the severed conductors falling downwardly through the bores in the ceramic header 12 and against the push rods and stops of the jig 102.

Following the cutting of the nine wires 101 and their insertion into a header wafer 12, the jig 102 containing this assembly is removed from the jig support 98 of the cutting apparatus 80 and is transferred to a similar jig support 114 of the punching apparatus 82.

The punching apparatus 82 comprises a base 116 on which a table block 118 and an upright frame 120 are mounted. The frame 120 supports a punching mechanism 122 which includes a plurality of tubular punches which are adapted to be advanced through a die member 124. The die 124 is slotted to receive a suitable ribbon of brazing material from which washers can be punched. The ribbon of brazing material, may, for example, resemble the brazing material strip 69 with the exception that each set of prepunched holes therein will be arrayed to correspond with the array of eleven bores 14 in the ceramic header wafer 12.

An eccentric cam 126 fixed to a shaft 128 is adapted to be rotated by a hand wheel 130 to drive the tubular punches of the punching mechanism 122 vertically down and through the ribbon of brazing material to punch brazing washers therefrom.

The jig holder 114, similar to the jig holder 98 of the cutting apparatus 80, is mounted on the table block 118 and is adapted to receive a jig 102 and position it in alignment with the punching mechanism 122 and the die 124.

A compressed air system is provided which includes a cylinder 132, a hose 134, a spool-type valve 136, and a source of air pressure indicated by "Air In." A plunger 138 attached to the piston rod of the air cylinder 132 is adapted to thus be advanced vertically upward and into contact with a push rod of the jig 102 contained in the jig support 114 for purposes as hereinbefore described with reference to FIG. 3*k*.

The compressed air system also includes connection of the air pressure source (not shown) through a push button valve 140 to the punching mechanism 122. The purpose of this portion of the system will be hereinafter described with reference to FIG. 20.

In operation of the punching apparatus 82, a jig 102 having header wafer 12 with its eleven conductors is placed in the jig holder 114 and aligned with the die 124. A suitable prepunched ribbon of brazing material is inserted in the slot 142 and aligned with the bores of the die 124. The hand wheel 130 is then rotated to drive the punching rods vertically downward and through the ribbon of brazing material to punch eleven brazing washers therefrom.

During this downward movement the entire punching mechanism 122 is first moved into predetermined spaced operable relationship with the jig holder 114 and then the tubular punches further actuated downwardly through the brazing material. Downward advance of the punching rods is continued so as to force the washers over the conductors extending upwardly out of the header wafer 12. This operation is essentially that as described with reference to FIG. 3*j*. The spool-type air valve 136 is then opened to actuate the plunger 138 upwardly and thus push the lead-in conductors 16 to their ultimate position relative to the header wafer 12. This operation is essentially that is described with reference to FIG. 3*k*. With the apparatus in this condition, the push button air valve 140 is actuated to operate a washer-release or washer-stripping mechanism hereinafter described with reference to FIG. 22. The hand wheel 130 is then released to raise the tubular punch rods, the push button air valve 140 is released and thus closed, and finally the spool valve 136 is closed. Thus, a stem assembly 11 is completely assembled for transfer to a suitable brazing jig and furnace for integration with the other parts of the electron tube 10.

*Wire Feed and Check Mechanisms*

In FIGS. 5 and 5*a* there is illustrated the wire feed and wire check mechanisms 91 and 92, respectively. As illustrated in FIG. 4, both units are supported on the two vertical columns 87 of the cutting apparatus 80.

The wire feed unit 91 is adapted to be vertically slidable along the columns 87 and includes a pair of sleeve bushings 144 for this purpose. The wire feed unit 91 is adapted to be advanced along the columns 87 by a drive means comprising a pair of linkages 146, one at each end of the feed unit 91, connected between the slidable feed unit 91 and the vertically fixed wire guide member 90. As shown in FIG. 5*a*, each linkage 146 includes a support bracket 148 attached to the guide member 90 and a pair of interconnected pivotal arms 150 and 152, the former mounted on the bracket 148 and the latter mounted on the feed unit 91. The hand wheel 104 and the arms 150 are fixed to a shaft 154 journaled in the brackets 148. Thus, rotary motion of the hand wheel 104 results in an actuation of the linkages 146 and thus a vertical movement of the feed unit 91 along the upright columns 87.

Limitations of the vertical movement of the feed unit 91 is provided by an upper stop 106 fixed to one of the columns 87 and the lower post stop 108 mounted adjacent the check unit 92. The post stop 108 is provided with a stepped end including a reduced diameter end portion 156. A bore recess 158 of slightly larger diameter than the diameter of the portion 156 is provided in the feed unit 91 for the purpose of receiving the end portion 156 therein. The entire post stop 108 is mounted in a plate 160 which in turn is pivotally mounted on the right column 87. The check unit 92 is provided with an arcuate slot 162 (FIG. 10) to permit pivoting of the plate 160 and stop post 108 about the right column 87. Thus, when the stop post 108 is in one of its pivoted positions, the feed unit 91 may be advanced downwardly to an extreme position with the end portion 156 being received in the recess 158. When the stop post 108 is swung about the column 87 so that the end portion 156 is moved out of the alignment with the recess 158, the limit of downward vertical motion of the feed unit 91 is at a somewhat higher position as determined by the end 164 of the stop post 108 contacting the bottom surface 166 of the feed unit 91. The purpose of such selective limit of vertical motion of the feed unit 91 is to permit the wires 101 to be advanced into the cutting blades to eject the severed conductors therefrom in a manner similar to that described with reference to FIG. 3*d*.

The check unit 92 is normally maintained in a fixed vertical position of the columns 87. However, for the purpose of cleaning and repair thereof, the check unit 92 is provided with a pair of sleeve bushings 168 for slidable movement along the columns 87. A set screw 170 is provided for fixing the check unit in its required position during a stem fabricating operation.

*Detail of Feed Unit*

Figures 6, 7, 8, 9:
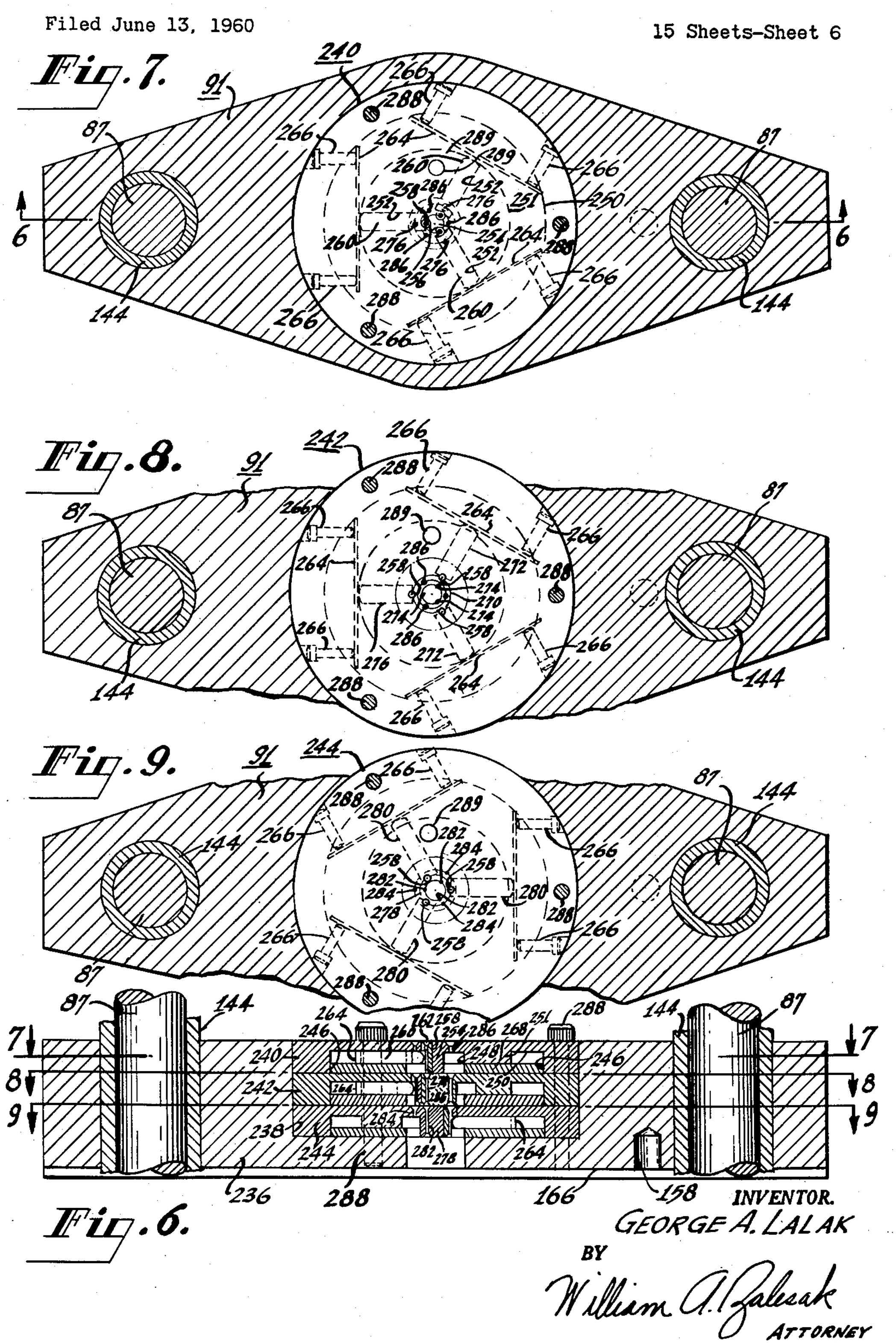
Figure 6A:
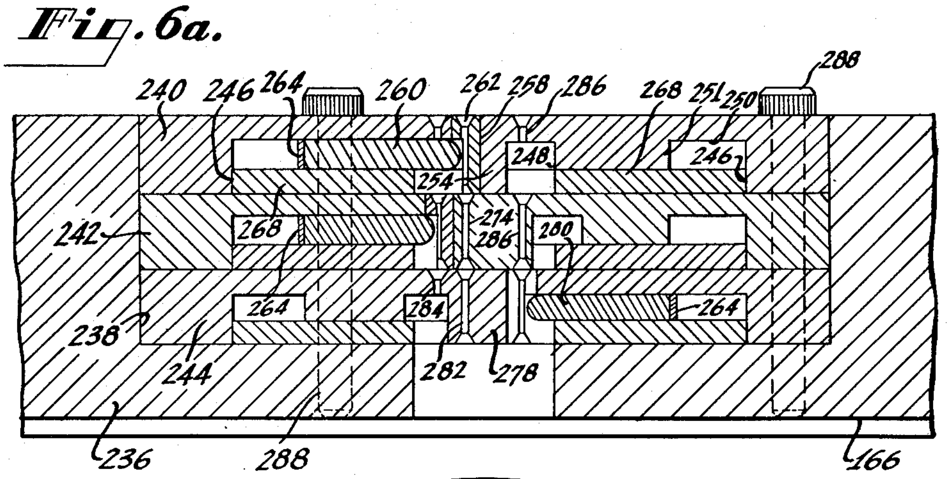

FIGS. 6, 6*a*, 7, 7*a*, 8, and 9 illustrate in detail the assembly of the feed unit 91. FIG. 6 is a section view taken vertically therethrough and through the two columns 87. FIG. 6*a* is an enlarged view of a portion of that shown in FIG. 6. The feed unit 91 comprises a thick plate-like housing 236 having a pair of bores therethrough in which the sleeve bushings 144 and the columns 87 are disposed. The housing 236 includes a cylindrical well 238 therein which contains a stack of three circular disks or plates 240, 242, and 244.

Figure 7A:
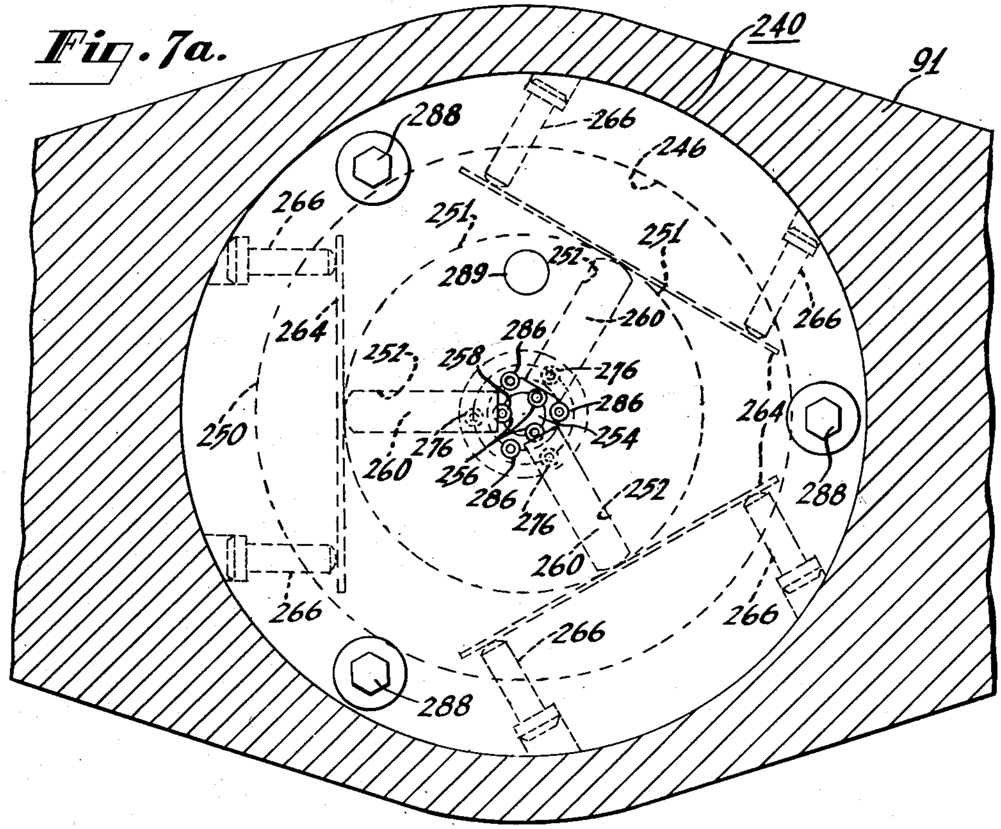

FIGS. 7, 7*a*, 8, and 9 illustrate section views of the disks 240, 242, and 244, taken along lines 7—7, 8—8, and 9—9, respectively. FIG. 7*a* is an enlarged view of a portion of that shown in FIG. 7. Each of the three disks 240, 242, and 244 comprise means for individually gripping each of three wires 101 of a set of conductors on a different one of three circles corresponding respectively, to circles 20, 22, or 24 illustrated in FIG. 2. Means in the top disk 240 is adapted to grip the three wires on the circle 20; means in the middle disk 242 is adapted to grip the three wires on the circle 24; and means in the bottom disk 244 is adapted to grip the three wires 101 on the circle 22. Thus, the feed unit 91 is adapted to individually grip all nine wires 101 fed from the array of nine spools 89 and downwardly through the guide tube 99 and the feed and check units 91 and 92.

As best shown in FIGS. 6, 6*a*, 7, and 7*a* the disk 240 has an annular recess or cavity 246 in the bottom thereof which in turn has in its bottom an inner annular channel or cavity 248 and an outer annular channel or cavity 250 forming an annular inverted ridge 251 therebetween.

As shown in FIGS. 7 and 7*a*, three radial slots or channels 252 equidistantly spaced 180° from each other are provided which communicate between the inner and outer annular channels 248 and 250 through the ridge 251. A center post 254 is provided in the top disk 240 by virtue of the surrounding inner annular channel 248. The center post 254 is provided with three vertical half cylindrical slots 256 therein, one radially aligned with each of the radial slots 252.

A tubular bushing 258 of wear-resistant material, such as Carboloy alloy, is disposed in each of the half cylindrical slots 256. A finger gripper 260 of similar alloy material is disposed in each of the radial channels 252 and contacts the tubular bushings 258. As shown in FIGS. 6 and 6*a*, the tubular bushings 258 have one side thereof cut away so as to permit the finger grippers 260 to be extended into the tubular opening 262 thereof. The tubular openings 262 are of suitable size to freely receive therethrough one of the wires 101 from the supply spools 89.

Three flat leaf springs 264 are disposed in the outer annular channel 250 and urge the fingers 260 radially inward. Three pairs of adjustable set screws 266 are threaded in the plate 236 for adjustment of the radial spring forces exerted, respectively, by the leaf springs 264 against the fingers 260. With the bushings 258, the fingers 260, and the springs 264 in place, an annular bottom plate 268 is disposed in the annular recess 246 for maintaining the elements of the top disk 240 in position.

In the operation of the feed unit 91, the top disk 240 serves to advance the three wires 101 disposed on the circle 20. To prepare for this feeding operation, these three wires are threaded through the tubular openings 262 in the bushings 258 in the top disk 240. The adjustment screws 266 of the top disk 240 are adjusted to cause the gripping fingers 260 to firmly press the three wires against the inner walls of the tubular passageways 262.

When the hand wheel 104 is rotated to actuate the feed unit 91 downwardly, the three wires, frictionally gripped by the fingers 260, are moved downwardly in the direction of travel of the feed unit 91. Whenever one of these wires is moved into axial abutment with a surface of the positioner device 96 (FIG. 4) and downward motion of the upper disk 240 is continued, that contacting wire will remain motionless and the bushing 258 through which it is threaded and the finger 260 in contact therewith will slide along the wire. Thus, it will be appreciated that the three wires gripped by the upper disk 240 are individually advanced thereby so that the three wires may be differentially longitudinally positioned, i.e., positioned at different locations along their respective paths of advance, in accordance with a predetermined arrangement of individual positioning surfaces in the positioner 96. In practice, two of the three wires passing through the bushings 258 of the upper disk 240 contact their stop surface in the positioner 96 and thus are positioned first. Then, upon continued advance of the feed unit 91, the remaining wire is carried further on by the upper disk 240 and is individually advanced until it contacts its stop position.

As shown in FIG. 8, the middle gripping disk 242 is quite similar to the upper gripping disk 240 with the exception of the radial positioning of the tubular bushings 258. In the middle gripper disk 242, a center post 270 is provided having a diameter substantially equal to the diameter of the outer circle 24 illustrated in FIG. 2. Thus, the tubular bushings 258 of the middle disk 242 are so disposed as to receive therethrough the three wires 101 which provide the conductors to be ultimately disposed in the bores 14 on the outer circle 24 of the wafer header 12. Accordingly, the middle gripper disk 242 is provided with three gripping fingers 272 which are slightly shorter than the fingers 252 of the upper gripper plate 240.

As shown by a comparison of FIGS. 7 and 8, the gripping fingers 260 of the upper disk 240 and the gripping fingers 272 of the middle disk 242 overlie each other. In order to permit the wires passing through the bushings 258 of the upper disk 240 to continue through the feed unit 91, bores 274 aligned therewith are provided through the center post 270 of the middle gripping disk 242. Also, in order to provide a continuous path for the wires 101 passing through the bushings 258 of middle disk 242, bores 276 (see also FIG. 7*a*) in the fingers 260 of the upper disk 240 are provided in alignment with the bushings 258 of the middle disk 242.

FIG. 9 shows that the lower gripping disk 244 is similar to the upper and middle disks 240 and 242 with the exception of both the radial and angular position of the tubular bushings 258 thereof. The center post 278 of the lower disk 244 has a diameter equal to the circle 22 so that its bushings 258 are radially disposed in alignment with the circle 22 on the header wafer 12. Accordingly, gripper fingers 280 are provided in the lower gripping disk 244 having a length intermediate the length of the fingers 260 and 262 of the upper and middle plates. Also, the tubular bushings 258 of the lower gripping disk 244 are angularly displaced 60° from those of the upper and middle disks 240 and 242. Thus, the bushings 258 of the lower disk 244 are positioned to feed three wires 101 into the bores in the header wafer 12 on the circle 22.

An array of three bores 282 are provided through the center post 278 in alignment with the bores 274 and the bushings 258 of the upper plate 240. Likewise, an array of three bores 284 is provided in the lower disk 244 in alignment with the bushings 258 of the middle disk 242. In the same manner suitable arrays of bores 286 are provided (see also FIG. 7*a*) in the upper and middle disks 240 and 242 in alignment with bushings 258 of the lower plate 244.

Three screws 288 are used to fasten the three disks 240, 242, and 244 to the housing 236. A dowel pin 289 which extends through the three disks 240, 242, and 244, and into the housing 236 is used to align the disks with the other units of the cutting apparatus 80.

*Detail of Check Unit*

The reverse-motion check unit 92 illustrated in FIGS. 10 and 11 is similar to the feed unit 91 in the respect that it includes a thick plate-like housing 290 mounted on the columns 87 which has a circular well 292 therein in which three disks or plate 294, 296, and 298 are mounted. The three check unit disks 294, 296, and 298 are similar to the top, middle, and lower disks 240, 242, and 244 of the feed unit in the respect that each one acts upon the three wires of a set of wires aligned on one of the three circles 20, 22 and 24. The top disk 294 acts on the wires aligned on the circle 20; the middle disk 296 acts on the wires aligned on the circle 24, and the bottom disk 298 acts on the wires aligned on the circle 22. The three check disks 294, 296, and 298 are similar to each other in the manner in which they act on their respective sets of wires. They differ from each other in the relative size and positioning of their internal elements. Accordingly, the top disk 294 is functionally representative of all three disks.

The top disk 294 is provided with an annular channel or cavity 300 from which three radial slots 302 communicate to the outer periphery of the disk. Three tubular bushings 304 are disposed through the disk 294 in alignment with the three wires 101 aligned on the circle 20. As shown in FIG. 11, the bushings 304 are cut away on a portion of their outer sides to the center thereof. Each bushing 304 is disposed in radial alignment with one of the slots 302. A cantilever leaf spring 306 is disposed in each of the slots 302 and secured to the disk 294 by a screw 308. Each of the springs 306 is provided with a wear-resistant cylindrical contact tip 310. The springs 306 are angled slightly downwardly so that the contact tips 310 are urged into the region of the passageway 312 of their associated tubular bushings 304 at an acute angle with the axis of the bore. Thus, when a wire 101 is disposed through the passageway 312 of the bushing 304, it is yieldably gripped in opposition to an advance downwardly therethrough. However, due to the orientation of the spring 306 and the angled direction of frictional bearing of the cylindrical tip 310 against the wire, when the wire is attempted to be advanced upwardly through the passageway 312, it is non-yieldably gripped by the cylindrical tip 310 pressing it against the wall of the passageway 312.

The gripping pressure of the spring grippers 306 of the check unit are such that a wire yieldably frictionally gripped by the feed unit 91 can be shoved downwardly through the bushing 304 of the check unit 92 and will slide freely therethrough and over the cylindrical tip 310. However, when the feed unit is retracted vertically upward, the non-yieldable frictional gripping of the check unit springs 306 exceed the yieldable gripping of the fingers in the feed unit 91 such that upward retraction of a wire 101 is prevented. The wire rather slides against the yieldable frictional gripping of the feed unit fingers. Thus, a co-operation of the feed and check units 91 and 92 permit an independent unidirectional advance of each of the nine wires 101 in a vertically downward direction against the length positioner 96.

*Cutter and Positioner Mechanisms*

FIGS. 12 and 13 are enlarged plan and section views, respectively, of the cutter and positioner mechanisms 94 and 96 of the cutting apparatus 80 of FIG. 4. As described with reference to FIG. 4, the cutter mechanism 94 and the positioner mechanism 96 are mounted on a plate 93 supported on the columns 87 which in turn are mounted on the platform 85.

The support plate 93 is in fact a composite structure. As such, the support plate 93 comprises a pair of wing members 320 spaced from each other and mounted on the two columns 87, a rear flange 322 bolted to both wings 320, and top and bottom strap plates 324 and 326, respectively. The strap plates 324 and 326 are bolted to the two wings 320, e.g., by bolts 328. The composite plate structure 93 thus provided includes a rectangular housing cavity in which the elements of the cutter mechanism 94 and the positioner 96 are mounted.

As shown in FIG. 13, a series of plates are stacked within the housing of the support plate 93 and include an upper cutter blade 330, a lower cutter blade 332, a spacer plate 334, and a positioner support plate 336. The two cutter blades 330 and 332 of the cutter mechanism 94 are provided with inserts 338 and 339, respectively, of a wear resistant material such as tungsten carbide. The inserts 338 and 339 are provided with arrays of bores therethrough corresponding to the array of bores 14 in the header wafer 12. Thus, when the wires 101 are threaded through the aligned bores of the inserts 338 and 339, and the inserts then moved laterally relative to each other, a cutting or severing of the wires 101 results.

Such lateral movement of the cutter blades 330 and 332 is provided by actuation of the lever 110. The lever 110 includes a plate portion having an eccentric arcuate slot 340 therein into which a pin 342 is disposed. The pin 342 is fixed in the top cutter blade 330. Thus, when the lever 110 is pivotally actuated clockwise (as viewed in FIG. 12) about its pivot 344, the pin 342 is moved to the left (as viewed in FIG. 13). Such movement also moves the top cutter blade 330 and its insert 338 to accomplish a wire cutting action. The lower blade 332 of the cutter mechanism 94 is fixed against lateral movement by virtue of the mounting bolts 328 which extend therethrough.

The wire length positioner 96 is hereinafter detailed with reference to FIGS. 14 and 15. The mounting thereof and its lateral actuation as schematically described with reference to FIGS. 3*d* and 3*e* is shown in FIGS. 12 and 13. The wire length positioner 96 is mounted on the support plate 336. A lateral shifting of the positioner 96 is obtained by actuation of the lever 112. The lever 112 is pivotally mounted on a pin 346 secured in one of the wing members 320. The lever 112 extends beyond its pivot pin 346 to beneath the support plate 336. A second pin 348 is mounted in recess bores adjacent the end of the lever 112 and in the rear of the mounting plate 336. Thus, a clockwise actuation as viewed in FIG. 12 of the lever 112 causes the support plate 336 and the wire length positioner 96 carried thereby to be laterally shifted to the left as viewed in FIG. 13.

FIGS. 12 and 13 also illustrate the support arrangement of the jig holder 98. As shown in these figures, the platform 85 is provided with a portion cut away resulting in an opening through the platform. The jig holder 98 is mounted on a rectangular table 350 fitted in this opening. As shown in FIG. 12, the table 350 is somewhat smaller than the opening, thus providing a clearance 352 therebetween. The table 350 is in turn mounted on the vibrating platform 354 of the vibrator 100.

In order to permit insertion of a jig 102 into the jig holder 98, the table 350 includes a sliding plate 356 to which the jig holder 98 is attached. The sliding plate 356 is mounted in a dove-tail way provided by the side plates 358 secured to the table 350. A knob 360 is attached to the sliding plate 356 for manual sliding operation thereof. Thus, the plate 356 and jig holder 98 attached thereto may be moved to the left as viewed in FIGS. 12 and 13 to shift the jig holder 98 from a vertically aligned position beneath wire length positioner 96.

For the purpose of aligning a header wafer 12 carried by the jig holder 98 with the positioner mechanism 96, a slot 362 (FIG. 12) is provided in the support plate 336 of the positioner 96. Thus, in accordance with the method of fabricating the stem 11, the two lead-in conductors 16 to the heater coil are disposed in their proper bores 14 in a header wafer 12. The header wafer 12 is placed in a jig 102 and the jig 102 placed into the jig holder 98. Then, in sliding the jig 102 and header wafer 12 to an aligned position underneath the positioner 96, the two heater lead-in conductors disposed in the header wafer 12 slide into the slot 362, thus angularly orientating the header wafer 12 so that its bores 14 are aligned with the bores of the positioner 96.

*Details of Wire Positioning and Cutting Mechanisms*

As shown in FIGS. 14 and 15, the wire positioner 96 comprises a plurality of tubular members 370–378 mounted in the support plate 336. Each of the tubular members 370–378 is provided at one end with a reduced outer diameter portion 380 which is press fitted into a mating bore through the support plate 336. As shown in FIG. 15, the tubular members 370–378 are mounted in an array corresponding to the array of bores 14 in the header wafer 12. In the case of the stem 11, nine tubular members are, accordingly, provided.

As shown in FIG. 14, the tubular members 375, 376, and 371 are of different axial length and thus extend above the support plate 336 to different vertical positions. Accordingly, the walls of these three tubular members, as well as the other six, are used as the differentially longitudinally positioned stop surfaces against which the wires 101 are advanced into abutting contact by the feed unit 91. This feature or method step of the invention is also described with reference to FIG. 3*a*.

As shown in FIG. 15, when the positioner 96 is located for a wire positioning operation, the wires 101 are aligned with the walls of the tubular members. Moreover, each wire 101 contacts its associated tubular member on the same side thereof as do the other wires their tubular members. Accordingly, a lateral shifting of the positioner 96, as indicated by the arrow 382, will cause the bores of the tubular members 370–378 to be brought into alignment with the nine wires 101. This shifting action corresponding to the shifting action of the positioner 50 is illustrated by FIG. 3*d*. This is the same shifting action which is provided by actuation of the lever 112 (FIG. 12).

The wire 101 contacting the tube 370 serves as the lead-in conductor 16 for the anode 26 of the tube 10. The wires 101 contacting the tubes 371 and 372 serve as the support conductors 15 for the anode 26. The wire 101 contacting the tube 373 serves as the lead-in conductor 16 for the grid 28 and the wires 101 contacting the tubes 374 and 375 serve as the support conductors 15 for the grid 28. The wire 101 contacting the tube 376 serves as the lead-in conductors 16 for the cathode 30 and the wires 101 contacting the tubes 377 and 378 serve as the support conductors 15 for the cathode 30. The two wires 384 (FIG. 15) are the lead-in conductors for the heater coil 44 which, according to the fabrication of stem 11, are disposed in the header wafer 12 prior to the lead positioning and cutting operations provided by the positioner 96 and the cutting mechanism 94.

Tubes 371 and 376 are shown in FIG. 14 to be spaced closer together than the sum of their outer radii. Accordingly, contacting wall portions of the tubes 371 and 376 have been cut away to permit the desired close axial spacing of these two tubes. Tube 371 is provided with an overhanging end portion 386 which serves as the positioning surface for the wire 101 associated therewith. As shown in FIG. 15, tubes 370 and 377 also require a partial relief of their adjacent wall portions to permit the required spacing therebetween. However, since the portions requiring such relief are angularly oriented with respect to the portions providing the abutting positioning surface of the wires 101 associated therewith, it is not necessary that an overhang on either of these tubes be provided similar to the overhang 386 of tube 371. However, for the same reason as existed with tube 371, the tube 378 is provided with an overhang portion in association with the adjacent tube 372.

In order to insure that the wires 101 will pass freely through the tubes 370–378, each tube is provided with an enlarged mouth 388 which tapers to a smaller diameter suitable for accurately aligning the wire lengths cut by the cutters 94 and passing through the positioner tubes with the bores 14 of the ceramic header 12. Likewise, to insure that the wire lengths do not stick in the lower cutter blade 332, its insert 339 is provided with a chamfer 390 around the opening of each of the bores therethrough. Thus, after a cutting operation of the blades 330 and 332, the wire lengths so provided can be positively ejected from the lower blade 332 by an advance of the wires 101 sufficient to bring their free ends within the region of the chamfers 390.

In operation of the cutting mechanism 94 and the positioner 96, the nine wires 101 are fed through the aligned bores of the cutter blades 330 and 332 and into contact with the walls of the tubes 370–378. This condition is illustrated in FIG. 14. The wires 101 are then severed by a lateral movement of the upper blade 330. The positioner 96 is then laterally shifted to the left as viewed in FIG. 14 to bring the bores of the tubes 370–378 into alignment with the wire lengths resting on the walls thereof. The wires 101 are then advanced by an amount slightly less than the thickness of the lower cutter blade 332. This amount of advance is determined by the post stop 108 (FIG. 5) contacting the bottom surface 166 of the feed unit 91. This advance forces the severed wire lengths into the tubes 370–378. If, for any reason such as because of burrs on the cut wires, the wire lengths remain attached to the parent wires 101, such attachment is broken by the lateral retraction of the positioner 96 to its position illustrated in FIG. 14. In any event the wire lengths are brought into alignment with the bores 14 of the ceramic wafer 12. Actuation of the vibrator 100 thereby causes the wire lengths to be settled by gravity through the header wafer 12 and into contact with the positioning surfaces of the jig 102.

*Assembly and Transfer Jig*

FIGS. 16, 17, and 18 illustrate the assembly and transfer jig 102. The jig 102 comprises a rectangular housing block 400 having an elongated cylindrical cavity therein. An alignment disk 402 is fixed within the cavity and spaced slightly from one end of the housing 400 which, for convenience, shall be referred to herein as the upper end of the housing 400. The alignment disk 402 is provided with an array of bores therein corresponding to the array of bores 14 in the header wafer 12. By virtue of its slight recessed position within the housing 400, the alignment disk 402 serves as a supporting seat for a header wafer 12 disposed in the jig 102 and an aligning support of the wire lengths dropped thereinto from the cutting and positioner 96.

Immediately below the aligning disk 402 is a cylindrically stepped positioner plate member 404 which provides the spaced positioning shoulder surfaces for the support conductors 15 of the anode, grid, and cathode electrodes 26, 28, and 30. The inner surface 406 positions the cathode support conductors; the middle surface 408 positions the grid support conductors, and the outer surface 410 positions the anode support conductors. Accordingly, the axial spacings between the surfaces 406, 408, and 410 correspond, respectively, to the axial spacings between the support flanges 36, 34, and 32 of the tube 10. The positioning surfaces 406, 408, and 410 are, moreover, axially spaced from a cathode header wafer 12 disposed in the jig 102 by an amount to provide a slight protrusion of the cathode, grid, and anode support conductors 15 above the wafer 12 when they are settled into contact with the positioning surfaces 406, 408, and 410.

The jig 102 also includes a moveable positioner block or plunger 412 having three posts 414, 416, and 418 mounted therein axially parallel with the jig 102. The posts 414, 416, and 418, respectively, provide the moveable positioning surfaces for the anode, grid, and cathode lead-in conductors 16. They are, accordingly, angularly oriented to correspond with the orientation of the bores 14 into which these conductors are disposed. In order to permit the anode, grid, and cathode lead-in conductors 16 to be advanced into contact with the posts 414, 416, and 418, apertures are provided through the positioning plate 404 in alignment with the posts.

Thus, when the support and lead-in conductors 15 and 16 are dropped from the positioner 96 through the header wafer 12, they are settled downwardly by the vibrator 100 either onto the stepped surfaces of the positioning disk 404 or onto one of the positioning posts 414, 416, or 418. At this stage of fabrication all of the conductors extend a very short and equal distance above the header wafer 12. Then, as described with reference to FIGS. 3*g*–3*k*, the jig 102 is transferred to the brazing washer punching apparatus 82. After the brazing washers have been punched and inserted over the extending ends of the conductors, the plungers 412 is actuated upwardly to axially position the lead-in conductors 16 for the anode, grid, and cathode to their ultimate positions relative to the support conductors 15. Actuation of the plunger 412 is provided by the air cylinder 132 described with reference to FIG. 4.

The upward extent of motion of the plunger 412 is determined by a shoulder 420 on the wall of the jig housing 400. When the upper surface 422 of the plunger 412 contacts the shoulder 420, the upper end surfaces of the three posts 414, 416, and 418 register, respectively, with the respective shoulder surfaces 410, 408, and 406 of the positioning disk 404. Thus, the three conductors for each of the anode, grid, and cathode electrodes are axially positioned so that their adjacent ends in the jig 102 below the header wafer 12 lie in a common plane.

The lower extent of the motion of the plunger 412 is determined by an adjustment shim 424 held in place by a retaining disk 426 in the lower end of the housing 400. The shim 424 is an interchangeable member and is sized so as to limit the downward position of the plunger 412 so that when the lead-in conductors 16 are received in abutment on the end surfaces of the posts 414, 416, and 418, their upper ends will protrude above the ceramic header wafer 12, equal to the desired protrusion of the support conductors 15.

Angular orientation of the plunger 412 within the jig housing 400 is maintained by a key 428. As shown in FIG. 16, opposed longitudinal slots are provided along one side of the plunger 412, the alignment disk 402, the positioner member 404, and the housing 400. The key 428 is secured in the housing 400 by means of a dowel pin 432. For example, the key 428 may be fixed to the jig housing 400 dowel pin.

The plunger 412 is also provided with a center post 434 which has an axial bore 436 therein. The bore 436 is of sufficient diameter and length to freely receive the heater coil 44 of the tube 10. In using the jig 102, a heater coil 44 is attached to two lead-in conductors 16. These conductors are then disposed into the proper bores 14 of the header wafer 12. The header wafer 12 is then seated on the aligning disk 402 with the heater coil 44 being received in the bore 436. When the heater coil 44 is disposed within the bore 436, the lead-in conductors 16 thereof are supported on the end wall surface 438 of the center post 434. Thus, like the lead-in conductors of the anode grid and cathode electrodes supported on the post 414, 416, and 418, the heater lead-in conductors are also adjustably positioned by the axial actuation of the plunger 412.

The jig housing 400 and the alignment disk 402 are provided with openings or recesses 440 and 442, respectively. This permits the extension of tweezer apparatus (not shown) into the jig 102 for the purpose of engaging the wafer 12 and removing it from the jig. The housing openings 440 also permit visual inspection of the loading of the conductors into the jig.

*Washer Punching Apparatus Details*

FIGS. 19–20 illustrate details of the washer punching apparatus 82 of FIG. 4. FIG. 19 shows the frame 120 to comprise a generally F-shaped member (reversed left to right in FIG. 19). The punching mechanism 122 is supported by the lower arm 450 of the frame 120. The jig holder 114 is disposed in the opening beneath the lower arm 450, and the actuating mechanism for the punching mechanism 122 is disposed in the opening between the lower arm 450 and the upper arm 452.

As described with reference to FIG. 4, a punching operation is performed by rotary actuation of the hand wheel 130 which rotates the eccentric cam 126. The cam 126 engages a roller 454 which is mounted on a shaft 456 which is in turn mounted in a yoke 458 which forms a part of the punching mechanism 122. Thus, rotary actuation of the hand wheel 130 results in a vertical movement of the punching mechanism 122 to perform a washer punching operation.

As shown in FIG. 20, the punching mechanism 122 includes a die slide 466 which is slidable in the F frame 120, and a punch housing 468 which is slidable in the die slide 466. The die slide 466 supports the die 124. The yoke 458 in which the cam roller 454 is mounted is connected directly to the punch housing 468.

As viewed in FIGS. 19 and 20, downward slidable motion of the die slide 466 in the frame 120 is against the opposition of a first coil compression spring 469 mounted between the die slide 466 and the frame 120. Similarly, downward slidable motion of the punch housing 468 in the die slide 466 is against the opposition of a second coil compression spring 470 mounted between the punch housing 468 and the die slide 466. The spring constant of the first spring 469 is somewhat less than that of the second spring 470. Thus, when the drive cam 126 is actuated to drive the punch housing 468 downwardly, the first spring 469 compresses first permitting the entire punching mechanism 122 to move downwardly as a unit. This permits the die 124 to be properly positioned relative to the header wafer 12. An adjustable set screw 471 which is adapted to contact the arm 450 determines this positioning. When the screw 471 contacts the arm 450, further actuation of the cam 126 results in a compression of the second spring 470 and a slidable movement of the punch housing 468 in the die slide 466. This latter slidable movement in turn results in advance of a plurality of tubular punches 472 into and through the die 124.

The tubular punches 472 are mounted to the punch housing 468 by a pair of plates 473 and 474. The plates 473 and 474 are mounted in flat abutting contact with each other across the bottom of the housing 468. The lower plate 474 is provided with a recess 475 in its side facing the upper plate 473 and a plurality of bores therethrough in an array corresponding to the array of bores 14 in the ceramic header wafer 12. The axial section view of FIG. 20 is such as to show two of the eleven bores in the lower plate 474. A tubular punch 472 is disposed through each of the bores of the lower plate 474. Each punch 472 has an enlarged head 476 disposed in the enclosed recess 475 which maintains the punch 472 in position.

The punches 472 extend downwardly into an array of punch receiving bores in the die 124 which correspond to the array of bores 14 in the header wafer 12. The die 124 comprises a pair of plates 478 and 480 bolted together. A slot 481 is provided in the upper plate 478 for receiving the ribbon of brazing material. Thus, actuation of the hand wheel 130 drives the punches 472 downwardly through the brazing ribbon disposed in the slot 481 to punch washers of brazing material therefrom. The punch housing 468 is adapted to be moved vertically downward a distance sufficient to advance washers punched from the ribbon of brazing material into contact with a header wafer 12 supported in a jig 102 beneath the die 124.

The die 124 also includes a moveable finger 482 having a V-shaped end 483 (see FIG. 3*g*) for engaging the indexing V notches 72 in the brazing ribbon. The finger 482 is normally urged transversely toward the slot 481 by a tension spring 484. Thus, the ribbon of brazing material can be pulled through the slot 481 by any suitable means and the finger 482 will automatically engage, as a detent, each V notch 72 therein to align each prepunched array of holes therein with the array of punches 472.

Since the brazing washers are prepunched to provide a hole having a diameter which results in a snug fit over the conductors 15 and 16 in the header wafer 12, and since the washers also may be in an adhering contact with the tubular punches 472 following a punching operation, washer release or stripping means 485 is provided for contacting the upper ends of the conductors 15 and 16 to prevent their being pulled out of the header wafer 12 when the tubular punches 472 are retracted. Thus, a breaking of the adhering contact between the washers and the tubular punches 472 is assured.

The washer release means 485 comprises an air cylinder 486 fixedly mounted in the punch housing 468 and having a piston rod 488 which is spring biased in the direction into the cylinder 486. Air pressure is supplied to the cylinder 486 through the push button valve 140 (FIG. 4). A mounting block 494 is fastened to the piston rod 488 of the cylinder 486. A cup-like punch retainer plate 497 is in turn attached to the bottom of the mounting block 494. The cup 496 is provided with an array of bores therethrough. A washer stripper rod 498 is disposed through each of the bores and includes an enlarged head portion 500 disposed in the cavity 502 of the cup 496 to retain the rods 498 in place. The washer release rods 498 are slidable in the tubular punching rods 472. Thus, energization of the cylinder 486 by communication with the source of air pressure results in the washer release rods 498 being advanced vertically downward through the tubular punches 472 to contact the upper ends of the conductors 15 and 16 in the header wafer 12.

The mounting block 494 is provided with a circumferential recess 506 to reduce its bearing surface to two spaced portions at the ends thereof. And, since the space 504 between the cup 496 and the plate 474 is an enclosed volume, slots 507 along the bearing surfaces of the mounting block 494 are provided to permit escape of air into and out of the space 504 to thus prevent a pressure build-up.

The jig holder 114 (FIG. 19) is mounted on a slide plate 508 below the punching die 124 and on the table block 118. The table block 118 is provided with a dovetailed slot 510 (FIG. 4) to slidably receive the slide plate 508. A knob 512 is attached to the slide plate 508 for manual actuation thereof. Thus, the jig holder 114 may be slid from under the punching die 124 for the purpose of receiving a jig 102 therein. The jig holder 114 and jig 102 can then be slid back under the punching mechanism 122 and into alignment therewith for a washer punching operation.

*Modification of the Apparatus*

As previously pointed out, it is desirable to insure that the conductors 15 and 16 after being severed from their wires 101 be positively ejected from the cutters 94 by a short advance of the wires 101 into the cutters. In the apparatus of FIG. 5, such advance of the wires is provided by a feed unit 91 which is characterized by a frictional gripping of the wires which is ineffective when the wires 101 are advanced into abutting contact with a stop surface. In normal feeding of the wires 101, after contact with the stop surfaces of the positioner 96, the wires slide through the feed unit.

Since the feed unit 91 of FIG. 5 depends upon a yieldable frictional gripping which can be overcome, the condition may result in which the gripping by the feed unit 91 is not firm enough to insure that an advance of the wires 101 will result in the severed conductors 15 and 16 being driven from the cutters during the ejection step as described with reference to FIG. 3*d*. In some cases the ejecting wires 101 may slip in the feed unit 91.

In FIG. 21, a feed unit 520 is illustrated which obviates this potential problem by employing a gripping which during the conductor ejector portion of the feed is non-yieldable, but yet which during the differential positioning portion of the feed is yieldable and will permit the wires 101 to slide through the feed unit. The wire feed mechanism 520 of FIG. 21 comprises a feed unit 522 similar to the feed unit 91 of FIG. 5, and in novel operative relationship therewith, a positive feed means 524 similar to the check unit 92 of FIG. 5. A wire guide member 90 and a check unit 92 of the apparatus of FIG. 21 are, respectively, identical with the wire guide member 90 and the check unit 92 of the apparatus of FIG. 5.

In the wire feed mechanism 520, the positive feed means 524 is yieldably mounted on the wire feed unit 522 by a pair of compression coil springs 530. The positive feed means 524 is thus adapted to be moved vertically along the columns 87 together with the feed unit 522 over a first portion of the wire feeding stroke.

When the hand wheel 104 is actuated, the feed unit 522 and the positive feed means 524 are driven downward as a unit. This unitary advance continues until the positive feed means 524 contacts the bushings 168 of the check unit 92. During this first portion of the wire advance, the wires are non-yieldably gripped by the positive feed means 524. It is this portion of the wire advance that is used to positively eject the previously severed conductors 15 and 16 from the cutters.

When it is desired to advance wires into positioning abutment with the positioner 96, the hand wheel 104 is then further actuated to drive the feed unit 522 further downward against the compression of the springs 530. During this second portion of the feed movement, the positive feed means 524 is stationary and the wires are yieldably gripped by the frictional gripping of the feed unit 522. During this portion the wires slide downwardly through the positive feed means 524.

When the hand wheel 104 is actuated in a reverse direction to retract the wire feeding mechanism 520 to its original position, the feed unit 522 first moves upwardly while the positive feed means 524 remains stationary. During this portion of the retraction the springs 530 are decompressed. After the decompression of the springs is completed, further retraction of the feed unit 522 carries the positive feed means 524 along with it as a unit.

FIGS. 22 and 23 illustrate a check unit 540 which is a modification of the check unit 92 of FIGS. 5 and 21 and of the positive feed means 524 of FIG. 21, all three of which are detailed in FIGS. 10 and 11. The feed unit 540 may be substituted for either of the mechanisms 92 or 524 in their respective apparatuses.

The check unit 540 differs from the check unit 92 of FIGS. 9 and 10 in its wire gripping structure. In place of simple cantilever leaf springs 306 and cylindrical contacts 310, the feed unit 540 comprises a pivot block 542 having a tapered end surface 544, an elongated wire gripping finger or contact block 546, and a leaf-type positioning spring 548.

The pivot block 542 is spaced from the wire track of its associated bushing 550 a distance less than the length of the gripping element 546. Thus, the gripping element 546 is disposed between the pivot block 542 and the wire track at a slight acute angle. The positioning spring 548 acts to push upwardly (as viewed in FIGS. 22 and 23) on its gripping element 546 so as to tend to pivot the gripping element about its rounded end 552 which is held captive in the recess formed between the support disk 554 and the tapered end surface 544 of the pivot block 542. This urges the wire contact end 556 of the gripping element 546 upward against a wire disposed in the bushing at an acute angle with the wire. Thus, a yieldable gripping of the wire results when the gripper is urged relative to the wire in one direction; and a non-yieldable gripping results when the gripper is urged relative to the wire in the opposite direction.

By virtue of the relative size and spacings of the pivot block 542, the gripping element 546, and the bushing 550, movement of the gripping element 546 is limited to a slight rocking or pivoting about its rounded end 552 held captive against the tapered end surface 544 of the pivot block 542. More excessive movement of the gripping element 546 is precluded. By virtue of this construction feature of the gripping mechanism of the check unit 540, backlash or slippage is prevented.

Although only a section view is shown of the modified feed unit 540, it will be appreciated, other than the modification above-described, the unit 540 is similar to the unit 92 of FIGS. 5 and 10.

I claim:

1. Apparatus for individually frictionally gripping a plurality of wires disposed in predetermined parallel array, said apparatus comprising a plurality of members in stacked arrangement having a plurality of bores therethrough in an array corresponding to said predetermined parallel array and having cavities therein, a plurality of wire gripper means, each one of said gripper means being movably mounted in a cavity of a different one of said members and being co-operatively associated with a different one of said bores, and means urging each of said gripper means transversely of its associated bore.

2. Apparatus for individually frictionally gripping a plurality of wires disposed in predetermined parallel array, said apparatus comprising a housing, a plurality of plates stacked in said housing, said plates and said housing having a plurality of bores therethrough perpendicular to said plates in an array corresponding to said predetermined parallel array, said plates having cavities therein, a plurality of wire gripper means, each one of said gripper means being movably mounted in a cavity of a different one of said plates and being co-operatively associated with a different one of said bores, and means urging each of said gripper means transversely of its associated bore.

3. Apparatus for individually frictionally gripping a plurality of wires disposed in predetermined parallel array, said apparatus comprising a housing, a plurality of plates stacked in said housing, said plates and said housing having a plurality of bores therethrough perpendicular to said plates in an array corresponding to said predetermined array, each of said plates having at least one cavity therein communicating with one of said bores and extending transversely therefrom, a plurality of wire gripper means, each of said gripper means being mounted in one of said cavities in a different one of said plates and being co-operatively associated with a different one of said bores and means urging each of said grippers laterally into its associated bore along a direction perpendicular to said bore whereby wires disposed through said bores are slidable therethrough in either direction against a frictional gripping thereof.

4. Apparatus for individually frictionally gripping a plurality of wires disposed in a predetermined parallel array including a plurality of sets of a plurality of wires, said apparatus comprising a housing, a plurality of disks stacked in said housing, said disks and said housing having an array of aligned bores therethrough perpendicular to said disks corresponding to said predetermined array, each disk having a plurality of channels therein extending from each of the bores of a different set of bores, a plurality of wire gripper fingers, each one slidably disposed in a different one of said channels, a plurality of springs, each one associated with a different one of said fingers urging its finger into its associated bore.

5. Apparatus for individually frictionally gripping a plurality of wires disposed in a predetermined parallel array including three sets of three wires wherein the wires of each set of three are equidistantly positioned on one of three concentric circles and wherein wires on adjacent circles are angularly displaced from each other by 60°, said apparatus comprising a housing having a cylindrical well-like recess therein, three disks stacked in transverse disposition within said recess, said disks and said housing having three sets of three bores therethrough perpendicular to said disks corresponding to said predetermined array, each disk having three radial channels therein extending outward toward the periphery thereof from each of the three bores of a set of bores, the radial channels of different disks being associated with different sets of bores, a plurality of wire gripper fingers, each one slidably disposed in a different one of said channels, a plurality of springs, each one associated with a different one of said fingers and urging its finger radially inward perpendicular to the central axis of said disks and into the bore associated with said finger.

6. Apparatus for individually frictionally gripping a plurality of wires disposed in predetermined parallel array, said apparatus comprising a housing, a plurality of plates stacked in said housing, said plates and said housing having an array of bores therethrough perpendicular to said plates and in an array corresponding to said predetermined array, said plates having cavities therein, a plurality of wire grippers, at least one gripper mounted in a cavity of each of said plates and co-operatively associated with a different one of said bores, separate means urging each of said grippers into its associated bore, said grippers being adapted to exert a greater frictional gripping of wires disposed in said bores when said wires are urged through said bores in one direction than is exerted on said wires when said wires are urged through said bores in the opposite direction.

7. Apparatus for individually frictionally gripping a plurality of wires disposed in predetermined parallel array comprising a housing, a plurality of plates stacked in said housing, said plates and housing having an array of bores therethrough parallel to the central axis of said plates in an array corresponding to said predetermined array, a plurality of wire grippers, at least one gripper mounted in a cavity of each of said plates and co-operatively associated with a different one of said bores, separate means urging each of said grippers into its associated bore in a direction at an acute angle with the axis of its associated bore.

8. Apparatus for frictionally gripping a plurality of wires disposed in a predetermined parallel array with a given force when said wires are urged in one axial direction and with a greater force than said given force when said wires are urged in the opposite axial direction, said apparatus comprising a housing having a cylindrical well therein, a plurality of disks disposed transversely in said well in stacked array, said disks and said housing having an array of bores therethrough parallel to the central axis of said well, each of said disks having a plurality of cavities therein, each of said cavities communicating with and extending transversely from a different one of said bores, a plurality of wire grippers, each gripper being co-operatively associated with a different bore, different ones of said grippers being mounted in different ones of said cavities, each gripper comprising a cantilever leaf spring one end thereof to its respective disk and having a contact tip at its other end, said springs being adapted to restrict the movement of their respective contact tips to along a direction at an acute angle with the axis of their respective associated bores.

9. Apparatus for frictionally gripping a plurality of wires disposed in a predetermined parallel array with a given force when said wires are urged in one axial direction and with a greater force than said given force when said wires are urged in the opposite axial direction, said apparatus comprising a housing, a plurality of disks disposed in said housing in stacked array, said disks and said housing having an array of bores therethrough, each of said disks having a plurality of cavities therein, each of said cavities communicating with and extending transversely from a different one of said bores, a plurality of grippers, one for each bore co-operatively associated with its respective bore, different ones of said grippers being mounted in different ones of said cavities, each gripper comprising a pivotally mounted wire gripping block disposed with one end thereof adjacent its respective bore, and means pivotally urging said one end into its respective bore in a direction at an acute angle with the axis of said bore, whereby wires disposed through said bores are slidable therethrough in one direction against a frictional gripping by said contact blocks and are precluded from slidable movement therethrough in the opposite direction.

10. Apparatus for frictionally gripping a plurality of wires disposed in a predetermined parallel array with a given force when said wires are urged in one axial direction and with a greater force than said given force when said wires are urged in the opposite axial direction, said apparatus comprising a housing having a cylindrical well therein, a plurality of disks disposed transversely in said well in stacked array, said disks and said housing having an array of bores therethrough parallel to the central axis of said well, each of said disks having a plurality of cavities therein, each of said cavities communicating with and extending transversely from a different one of said bores, a plurality of wire grippers, each gripper being co-operatively associated with a different bore, different ones of said grippers being mounted in different ones of said cavities, each gripper comprising a contact block, a pivot socket receiving one end of said contact block, said contact block being pivotal therein and disposed with its opposite end adjacent its respective bore, leaf spring means mounted at its one end to said contact block and at its other end to the disk within which said gripper is disposed, said spring pivotally urging said opposite end of said contact block into its respective bore along a direction at an acute angle with the axis of said bore, said contact block being precluded from movement in any other direction, whereby wires disposed through said bores are slidable therethrough in one direction against a frictional gripping by said contact blocks and are precluded from slidable movement therethrough in the opposite direction.

11. Apparatus for differentially longitudinally positioning the adjacent ends of a plurality of loose wires which are relatively movable longitudinally and disposed in a predetermined parallel array, said apparatus comprising a support plate having a plurality of bores therethrough in an array corresponding to said predetermined array, a plurality of tubes, each one received in fixed relation within a different one of said bores and extending from a given side of said support plate parallel to the other of said tubes and means for advancing each of said loose wires a predetermined distance and independently of the others of said wires for differentially longitudinally positioning the ends of said wires.

12. Apparatus for longitudinally positioning the adjacent ends of a plurality of wires which are disposed in a predetermined parallel array, said apparatus comprising a support member, a plurality of tubes mounted on said support member and extending from one surface thereof parallel to each other and in an array corresponding to said predetermined array, said tubes having their free ends spaced at different distances from a plane perpendicular to said tubes, said free ends including planar portions, whereby said planar portions of said tubes provide longitudinally spaced stop surfaces against which the ends of said wires can be advanced to longitudinally position the ends of said wires.

13. Apparatus for differentially longitudinally positioning the adjacent ends of a plurality of wires which are disposed in a predetermined parallel array, said apparatus comprising a support member having an array of bores therethrough corresponding to said predetermined array, a plurality of tubes, one mounted in each of said bores and extending from one surface of said support member parallel to the other of said tubes, said tubes having their free ends spaced at different distances from a plane perpendicular to said tubes, said free ends including planar portions, whereby said planar portions provide differentially longitudinally spaced stop surfaces against which the ends of said wires can be advanced to differentially longitudinally position the ends of said wires.

14. Apparatus for differentially longitudinally positioning the adjacent ends of a plurality of small wires which are disposed in a close spaced predetermined parallel array, said apparatus comprising a support plate having a plurality of bores perpendicularly therethrough in an array corresponding to said predetermined array, a plurality of hollow cylindrical tubes, each tube concentrically received in fixed relation in a different one of said bores, said tubes extending different distances perpendicularly from a given side of said support plate, at least two of said tubes being laterally spaced a distance closer together than the sum of their outer radii, at least one of said two close spaced tubes being cut away along at least a portion of its side facing the other of said tubes to permit said tubes to be received within their respective bores without interfering with each other.

15. Apparatus for receiving an electron tube stem, said apparatus comprising a housing having an elongated recess therein, a positioner plate transversely disposed in said elongated recess and having axially spaced surfaces facing out of said recess and a plurality of bores therethrough, at least one bore in each of said spaced surfaces, a positioner block slidably disposed in said elongated recess on the side of said position plate opposite the spaced surface side, a plurality of rods mounted on said positioner block and extending toward said positioner plate in axial alignment with said bores, and means mounted in said recess on the spaced surface side of said positioner plate for supporting a header wafer of said stem in axially spaced relation with said positioner plate.

16. Assembly and transfer jig apparatus for receiving an electron tube stem comprising a header wafer having a plurality of bores therethrough in which a plurality of conductors are disposed, said apparatus comprising a housing having an elongated recess therein, a positioner plate transversely disposed in said elongated recess and having a stepped face providing surfaces axially spaced from each other, said plate having a plurality of axially parallel bores in predetermined array therethrough, at least one bore in each of said spaced surfaces, a positioner block slidably disposed in said elongated recess on the side of said positioner plate opposite said stepped surface side, a plurality of rods mounted on said positioner block and extending axially parallel toward said positioner plate in an array corresponding to the array of said positioner plate bores, said array of rods being axially aligned with said array of positioner plate bores and having their free end surfaces differentially axially spaced with respect to each other by amounts respectively equal to the axial spacing between the spaced surfaces of said positioner plate, and means mounted in said recess on the stepped surface side of said positioner plate for supporting said electron tube header wafer in axially spaced relation with said positioner plate.

17. Apparatus for cutting conductors from wire stock and for providing said conductors in a predetermined non-planar array, said apparatus comprising in spaced relationship in the order named a wire feed mechanism for positioning a plurality of wires in an array corresponding to said predetermined array and for engaging and moving said array of wires in a given direction, a cutter mechanism for severing said wires in a common plane, and a positioner mechanism for differentially longitudinally positioning said wires prior to severance.

18. Apparatus according to claim 17 and wherein said feed mechanism is adapted to grip said array of wires with a given gripping force during a first portion of the wire feed movement in said given direction and with a force less than said given force during a second portion of the wire feed movement in said given direction.

19. Apparatus for cutting conductors from wire stock and disposing said conductors in a predetermined nonplanar array of bores in a header wafer, said apparatus comprising in spaced relationship in the order named a feed mechanism for positioning a plurality of wires in an array corresponding to said predetermined array and for engaging and moving said array of wires in a given direction, a reverse-motion check mechanism to prevent movement of said wires in the opposite direction, a cutter mechanism for severing said wires, a positioner mechanism for differentially longitudinally positioning said wires, and means for supporting said wafer.

20. Apparatus according to claim 19 and wherein said feed mechanism includes a housing, a plurality of plates stacked in said housing, said plates and said housing having a plurality of bores therethrough perpendicular to said plates in an array corresponding to said predetermined array, each of said plates having at least one cavity therein communicating with one of said bores and extending transversely therefrom, a plurality of wire gripper means, each of said gripper means being mounted in one of said cavities in a different one of said plates and being co-operatively associated with a different one of said bores and means urging each of said grippers laterally into its associated bore along a direction perpendicular to said bore whereby wires disposed through said bores are slidable therethrough in either direction against a frictional gripping thereof.

21. Apparatus according to claim 19 and wherein said reverse-motion check mechanism comprises a housing, a plurality of plates stacked in said housing, said plates and said housing having an array of bores therethrough parallel to the central axis of said plates in an array corresponding to said predetermined array, a plurality of wire grippers, at least one gripper mounted in a cavity of each of said plates and co-operatively associated with a different one of said bores, separate means urging each of said grippers into its associated bore in a direction at an acute angle with the axis of its associated bore.

22. Apparatus according to claim 19 and wherein said positioner mechanism comprises a support plate having a plurality of bores therethrough in an array corresponding to said predetermined array, and a plurality of tubes, each one received in fixed relation within a different one of said bores, and from a given side of said support plate parallel to the other of said tubes.

23. Apparatus according to claim 19 and wherein said feed mechanism includes a housing, a plurality of plates stacked in said housing, said plates and said housing having a plurality of bores therethrough perpendicular to said plates in an array corresponding to said predetermined array, each of said plates having at least one cavity therein communicating with one of said bores and extending transversely therefrom, a plurality of wire gripper means, each of said gripper means being mounted in one of said cavities in a different one of said plates and being co-operatively associated with a different one of said bores and means urging each of said grippers laterally into its associated bore along a direction perpendicular to said bore whereby wires disposed through said bores are slidable therethrough in either direction against a frictional gripping thereof; and wherein said reverse-motion check mechanism comprises a housing, a plurality of plates stacked in said housing, said plates and said housing having an array of bores therethrough parallel to the central axis of said plates in an array corresponding to said predetermined array, a plurality of wire grippers, at least one gripper mounted in a cavity of each of said plates and co-operatively associated with a different one of said bores, separate means urging each of said grippers into its associated bore in a direction at an acute angle with the axis of its associated bore; and wherein said positioner mechanism comprises a support plate having a plurality of bores therethrough in an array corresponding to said predetermined array, and a plurality of tubes, each one received in fixed relation within a different one of said bores and extending from a given side of said support plate parallel to the other of said tubes.

24. Apparatus for cutting conductors from wire stock and disposing said conductors in a predetermined nonplanar array of bores in a header wafer, said apparatus comprising in spaced relationship a feed mechanism for positioning a plurality of wires in an array corresponding to said predetermined array and for gripping said array of wires and pulling said wires in a given direction, a positioner mechanism disposed on the side of said feed mechanism opposite said alignment fixture for differentially longitudinally positioning said wires, a cutter mechanism between said alignment fixture and positioner mechanism for receiving said array of wires and severing said wires in a common plane transverse thereto to provide a plurality of conductors in an array corresponding to said predetermined array, and means for supporting said wafer in a position to receive said array of conductors.

25. Apparatus for cutting conductors from wire stock and disposing said conductors in a predetermined nonplanar array of bores in a header wafer, said apparatus comprising in spaced relationship in the order named a feed mechanism for positioning a plurality of wires in an array corresponding to said predetermined array and for gripping said array of wires and pulling said wires in a given direction, a reverse-motion wire check mechanism through which said array of wires can be advanced in said given direction but which is adapted to preclude said wires being retracted therethrough in the opposite direction, a cutter mechanism for receiving said array of wires and severing said wires in a common plane transverse thereto to provide a plurality of conductors in an array corresponding to said predetermined array, a positioner mechanism for differentially longitudinally positioning said wires before they are severed to form said conductors, and means for supporting said wafer in a position to receive said array of conductors.

26. Apparatus for cutting conductors from wire stock and disposing said conductors in a predetermined, nonplanar, parallel array of bores in a header wafer, said apparatus comprising in spaced relationship in the order named; a wire feed mechanism moveable along a path for positioning a plurality of wires in an array corresponding to said predetermined array and for individually frictionally gripping said array of wires with a given force for pulling said wires in a given direction along said path; a reverse-motion wire check mechanism adapted to frictionally grip said array of wires with a force less than said given force when said wires are urged in said given direction by said feed mechanism and with a force greater than said given force when said wires are urged in the opposite direction by said feed mechanism; a wire cutter mechanism for receiving said array of wires and severing said wires in a common plane transverse thereto to provide a plurality of conductors in an array corresponding to said predetermined array; a wire positioner mechanism comprising differentially longitudinally spaced stop surfaces disposed in an array corresponding to, and in alignable relationship with, said predetermined array of said conductors, said positioner mechanism being laterally moveable to remove said stop surfaces from the paths of said conductors; and means for supporting said wafer in a position to receive said array of conductors.

27. Wire feed apparatus comprising first and second means yieldably mounted to each other in variable spaced relationship along a given path, said first means being adapted to yieldably grip a wire with a given gripping force when said first means is urged relative to said wire in either direction along said path, said second means being adapted to yieldably grip said wire with a force less than said given gripping force when said second means is urged relative to said wire in one direction along said path and to non-yieldably grip said wire when said second means is urged relative to said wire in the opposite direction along said path.

28. Wire feed apparatus according to claim 27 and wherein said first means comprises a housing, a plurality of plates stacked in said housing, said plates and said housing having a plurality of bores therethrough perpendicular to said plates in an array corresponding to said predetermined array, each of said plates having at least one cavity therein communicating with one of said bores and extending transversely therefrom, a plurality of wire gripper means, each of said gripper means being mounted in one of said cavities in a different one of said plates and being co-operatively associated with a different one of said bores and means urging each of said grippers laterally into its associated bore along a direction perpendicular to said bore whereby wires disposed through said bores are slidable therethrough in either direction against a frictional gripping thereof; and wherein said second means comprises a housing, a plurality of plates stacked in said housing, said plates and said housing having an array of bores therethrough parallel to the central axis of said plates in an array corresponding to said predetermined array, a plurality of wire grippers, at least one gripper mounted in a cavity of each of said plates and co-operatively associated with a different one of said bores, separate means urging each of said grippers into its associated bore in a direction at an acute angle with the axis of its associated bore.

29. Wire feed apparatus for advancing a wire along a given path, said apparatus comprising a frame, a first means mounted on said frame for movement along said given path and adapted to frictionally grip said wire with a given force when urged relative to said wire in either direction along said path, drive means connected to said first means for moving said first means along said path relative to said frame, a second means mounted to said first means for movement along said path and adapted to frictionally grip said wire with a force greater than said given force when urged relative to said wire in one direction along said path and with a force less than said given force when urged relative to said wire in the opposite direction along said path, yieldable mounting means mounting said second means to said first means in spaced relation along said path and being adapted to yield to vary said spacing, and stop means fixed relative to said frame for limiting the movement of said second means in said one direction along said path, whereby a change of spacing between said first and second means is effected upon continued actuation of said drive means after said second means contacts said stop means.

30. Wire feed apparatus according to claim 29 and wherein said first means comprises a housing, a plurality of plates stacked in said housing, said plates and said housing having a plurality of bores therethrough perpendicular to said plates in an array corresponding to said predetermined array, each of said plates having at least one cavity therein communicating with one of said bores and extending transversely therefrom, a plurality of wire gripper means, each of said gripper means being mounted in one of said cavities in a different one of said plates and being co-operatively associated with a different one of said bores and means urging each of said grippers laterally into its associated bore along a direction perpendicular to said bore whereby wires disposed through said bores are slidable therethrough in either direction against a frictional gripping thereof; and wherein said second means comprises a housing, a plurality of plates stacked in said housing, said plates and said housing having an array of bores therethrough parallel to the central axis of said plates in an array corresponding to said predetermined array, a plurality of wire grippers, at least one gripper mounted in a cavity of each of said plates and co-operatively associated with a different one of said bores, separate means urging each of said grippers into its associated bore in a direction at an acute angle with the axis of its associated bore.

31. Apparatus for longitudinally positioning the adjacent ends of a plurality of loose wires which are relatively movable longitudinally and disposed in a predetermined parallel array, said apparatus comprising a support plate having a plurality of bores therethrough in an array corresponding to said predetermined array, a plurality of tubes, each of said tubes received in fixed relation within a different one of said bores and extending from a given side of said support plate parallel to the other of said tubes, and said tubes having free end portions against which said wires may be advanced for longitudinally positioning the ends of said wires.

32. Apparatus for longitudinally positioning the adjacent ends of a plurality of loose wires which are relatively movable longitudinally and disposed in a predetermined parallel array, said apparatus comprising a support plate having a plurality of bores therethrough in an array corresponding to said predetermined array, a plurality of tubes, each of said tubes received in fixed relation within a different one of said bores and extending from a given side of said support plate parallel to the other of said tubes, said tubes having free end portions against which said wires may be advanced for longitudinally positioning the ends of said wires, and means for laterally shifting said tubes for permitting said positioned wires to advance through said tubes.

33. Apparatus for longitudinally positioning the adjacent ends of a plurality of loose wires which are relatively movable longitudinally and which are disposed in a predetermined parallel array, said apparatus comprising a support member, a plurality of tubes mounted on said support member and extending from one surface thereof parallel to each other and in an array corresponding to said predetermined array, said tubes having their free ends spaced at different distances from a plane perpendicular to said tubes, said free ends including planar portions against which the ends of said wires can be advanced to longitudinally position the ends of said wires, and means for laterally shifting said tubes for permitting said wires advanced against said planar portions to advance through said tubes.

34. Apparatus for differentially longitudinally positioning the adjacent ends of a plurality of small wires which are disposed in a close spaced predetermined parallel array, said apparatus comprising a support plate having a plurality of bores perpendicularly therethrough in an array corresponding to said predetermined array, a plurality of hollow cylindrical tubes, each tube concentrically received in fixed relation in a different one of said bores, said tubes extending different distances perpendicularly from a given side of said support plate, at least two of said tubes being laterally spaced a distance closer together than the sum of their outer radii, at least one of said two close spaced tubes being cut away along at least a portion of its side facing the other of said tubes to permit said tubes to be received within their respective bores without interfering with each other, a portion of said one tube overhanging the free end of the other of said two close spaced tubes.

References Cited in the file of this patent

UNITED STATES PATENTS

| | | |
|---|---|---|
| 2,168,382 | Alden | Aug. 8, 1939 |
| 2,199,852 | Iden | May 7, 1940 |
| 2,412,930 | Walklet | Dec. 17, 1946 |
| 2,428,540 | Babbitt et al. | Oct. 7, 1947 |
| 2,464,405 | Knauf | Mar. 15, 1949 |
| 2,536,677 | Brunner et al. | Jan. 2, 1951 |
| 2,977,667 | Schnering | Apr. 4, 1961 |